United States Patent
Niwa

(10) Patent No.: US 12,067,836 B1
(45) Date of Patent: Aug. 20, 2024

(54) CONTROL SYSTEM, SERVER, AND CONTROL METHOD

(71) Applicant: Game Server Services, Inc., Tokyo (JP)

(72) Inventor: Kazutomo Niwa, Tokyo (JP)

(73) Assignee: Game Server Services, Inc., Tokyo (JP)

( * ) Notice: Subject to any disclaimer, the term of this patent is extended or adjusted under 35 U.S.C. 154(b) by 0 days.

(21) Appl. No.: 18/691,273

(22) PCT Filed: Dec. 11, 2023

(86) PCT No.: PCT/JP2023/044310
§ 371 (c)(1),
(2) Date: Mar. 12, 2024

(51) Int. Cl.
*G07F 17/32* (2006.01)
*G06F 7/58* (2006.01)
*H04L 9/00* (2022.01)

(52) U.S. Cl.
CPC .......... *G07F 17/3241* (2013.01); *G06F 7/588* (2013.01); *G07F 17/3227* (2013.01); *H04L 9/50* (2022.05)

(58) Field of Classification Search
None
See application file for complete search history.

(56) References Cited

U.S. PATENT DOCUMENTS 9,675,874 B1   6/2017 Park
2005/0288103 A1   12/2005 Konuma
(Continued)

FOREIGN PATENT DOCUMENTS

CN   107451477 A   12/2017
JP   2006006473 A   1/2006
(Continued)

OTHER PUBLICATIONS

International Search Report and Written Opinion issued on Jan. 16, 2024 for corresponding PCT Application No. PCT/JP2023/044310.

*Primary Examiner* — Ronald Laneau
(74) *Attorney, Agent, or Firm* — POLSINELLI PC

(57) ABSTRACT

Before a game is provided, a state is established in which each of a server 2 and a user terminal 3 is capable of using common node definition data ND corresponding to the game. A plurality of nodes indicating a state of the game are defined in the node definition data ND. While the game is being played by a user, the user terminal 3 transitions the node on the basis of the node definition data of the user terminal 3, changes a value of terminal-side setting information, and records transition reproduction information capable of reproducing the transition of the node and the changed value of the terminal-side setting information as a log in log data. In addition, the user terminal 3 transmits transmission log data DL including the log to the server 2. The server 2 reproduces the transition of the node on the basis of the transition reproduction information of the transmission log data and the node definition data ND of the server 2, changes a value of server-side setting information with the transition of the node, and compares the value of the server-side setting information with the value of the terminal-side setting information recorded in the transmission log data.

11 Claims, 10 Drawing Sheets

(56) References Cited

U.S. PATENT DOCUMENTS

| | | | | |
|---|---|---|---|---|
| 2015/0082215 A1* | 3/2015 | Sakai | ................ | G06F 3/04842 |
| | | | | 715/765 |
| 2021/0339142 A1 | 11/2021 | Suzuki et al. | | |
| 2021/0357492 A1* | 11/2021 | Fessel | ................ | G06F 21/62 |
| 2022/0329321 A1* | 10/2022 | Yoshino | ............ | H04L 12/4641 |
| 2023/0394913 A1* | 12/2023 | Idris | ................ | G07F 17/3244 |

FOREIGN PATENT DOCUMENTS

| | | |
|---|---|---|
| JP | 2019107082 A | 7/2019 |
| JP | 2019154667 A | 9/2019 |

* cited by examiner

FIG. 5

```
<STATE VARIABLE INFORMATION>                                              ND(NDa)
 · NUMBER OF SELECTIONS
 · POINT BALANCE
 · LOTTERY RESULT

<INITIAL NODE INFORMATION>
 · STANDBY NODE

<INDIVIDUAL NODE INFORMATION FOR STANDBY NODE>
 ●ACCEPTED EVENT INFORMATION
   · CARD SELECTION EVENT
   · END EVENT

<INDIVIDUAL NODE INFORMATION FOR LOTTERY NODE>
 ●ACCEPTED EVENT INFORMATION
   · LOTTERY COMPLETION EVENT
 ●INFORMATION OF PROCESS AT TIME OF TRANSITION
   · LOTTERY PROCESS
 ●INFORMATION OF EVENT TO BE ISSUED AT TIME OF COMPLETION
   · LOTTERY COMPLETION EVENT

<INDIVIDUAL NODE INFORMATION FOR END NODE>

<TRANSITION RULE INFORMATION>
                        NODE BEFORE                          NODE AFTER
                        TRANSITION      TRIGGER EVENT        TRANSITION
 ·TRANSITION RULE J1 : STANDBY NODE   CARD SELECTION EVENT     LOTTERY NODE
 ·TRANSITION RULE J2 : LOTTERY NODE   LOTTERY COMPLETION EVENT STANDBY NODE
 ·TRANSITION RULE J3 : STANDBY NODE   END EVENT                END NODE
```

FIG. 6

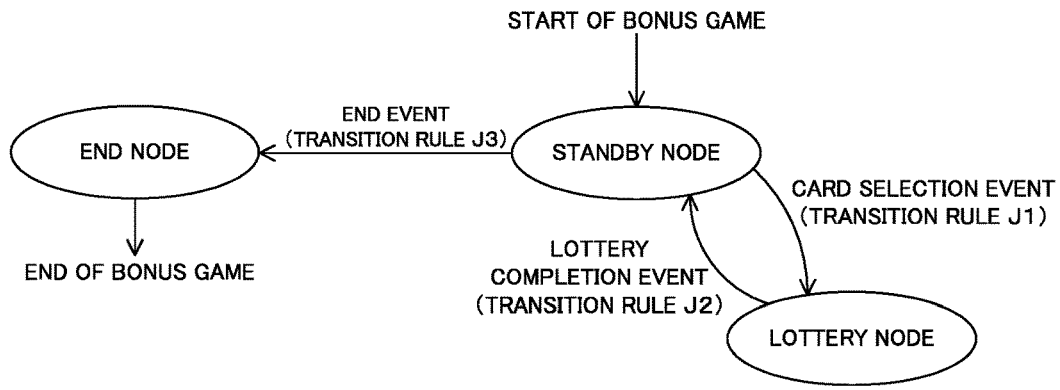

FIG. 7

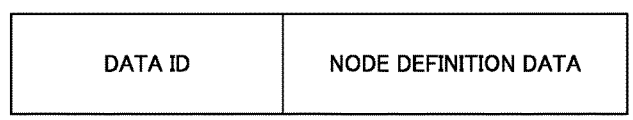

FIG. 9

| NODE-RELATED INFORMATION | | | | | | |
|---|---|---|---|---|---|---|
| RUNNING GAME ID | RANDOM NUMBER SEED | SETTING INFORMATION | | | | |
| | | MANAGEMENT INFORMATION | | STATE VARIABLES | | |
| | | NUMBER OF NODE TRANSITIONS | CURRENT NODE | FIRST STATE VARIABLE | SECOND STATE VARIABLE | .... |

FIG. 10

| REGISTERED NODE-RELATED INFORMATION | | | | | | |
|---|---|---|---|---|---|---|
| RUNNING GAME ID | RANDOM NUMBER SEED | REGISTERED SETTING INFORMATION | | | | |
| | | REGISTERED MANAGEMENT INFORMATION | | REGISTERED SATE VARIABLES | | |
| | | NUMBER OF NODE TRANSITIONS | CURRENT NODE | NUMBER OF SELECTIONS | POINT BALANCE | LOTTERY RESULT |
| GM01 | 0x32a7... | 0 | DUMMY VALUE | 0 | 1000pt | DUMMY VALUE |

CONTROL SYSTEM, SERVER, AND CONTROL METHOD

CROSS REFERENCE TO RELATED APPLICATIONS

This application is a National Phase filing under 35 U.S.C. § 371 of PCT/JP2023/044310, filed on Dec. 11, 2023. The entire contents of which are hereby incorporated by reference.

TECHNICAL FIELD

The present invention relates to a control system that provides a game using a server and a terminal, the server, and a control method executed by the control system.

BACKGROUND ART

In the related art, a control system is known in which a server and a terminal that is connected to the server via the Internet to communicate with the server to provide a game to a user in cooperation with each other. For this type of game, fraudulent activities may be performed by modifying a program of the terminal or by tampering with the communication between the server and the terminal. For example, the users may perform fraudulent activities that illegally modify game characters, items used in the game, points available for use in the game, and other elements related to the game in order to favorably progress the game. For the fraudulent activities, PTL 1 discloses a technique in which a server executes all processes for progressing a game to suppress fraudulent activities (see particularly paragraph 0004).

CITATION LIST

Patent Literature

PTL 1: JP2019-154667A

SUMMARY OF INVENTION

Technical Problem

The control system in which the terminal and the server provide the game in cooperation with each other requires high resistance to the fraudulent activities. Therefore, as described in PTL 1, the control system has a configuration in which the server executes the process for progressing the game (including a process of generating screen information with the progress of the game) and the terminal only displays a screen based on the screen information, which makes it possible to effectively suppress the fraudulent activities. However, this configuration has the following problem. That is, in the case of this configuration, the communication between the terminal and the server occurs frequently with the progress of the game. Therefore, the progress of the game may be delayed due to the frequent occurrence of the communication, which causes a decrease in user satisfaction. The above problem occurs.

The invention has been made to solve the problem, and an object of the invention is to suppress a delay in the progress of a game and to improve resistance to fraudulent activities.

Solution to Problem

In order to achieve the object, the invention has the following configuration. That is, before a game is provided, a state is established in which each of a server and a terminal is capable of using common node definition data corresponding to the game. A plurality of nodes indicating a state of the game are defined in the node definition data. Then, the terminal transitions the node on the basis of the node definition data of the terminal, changes a value of terminal-side setting information corresponding to the node definition data of the terminal with the transition of the node, and records transition reproduction information capable of reproducing the transition of the node and the value of the terminal-side setting information changed with the transition of the node as a log in log data while the game is being played by a user. In addition, the terminal transmits transmission log data including the log recorded in the log data to the server in a case where a log transmission condition related to the transmission of the log is established. Meanwhile, the server executes a verification process that reproduces the transition of the node on the basis of the transition reproduction information of the transmission log data received from the terminal and the node definition data of the server, changes a value of server-side setting information corresponding to the node definition data of the server with the transition of the node, and compares the value of the server-side setting information with the value of the corresponding terminal-side setting information recorded in the transmission log data.

Advantageous Effects of Invention

According to the invention having the above-described configuration, the following effects are obtained. That is, when the game is provided, the state is established in which the server and the terminal can use the common node definition data. Then, the terminal transitions the node on the basis of the node definition data of the terminal and progresses the game. That is, the terminal progresses the game without requesting the server to make any determination about the transition of the node. Therefore, it is possible to suppress frequent communication between the terminal and the server with the progress of the game and to suppress a delay in the progress of the game.

Further, according to the invention, the terminal records the transition reproduction information capable of reproducing the transition of the node and the value of the terminal-side setting information changed with the transition of the node as the log in the log data. In addition, the terminal transmits the transmission log data including the log to the server in a case where a predetermined condition is established. Meanwhile, the server reproduces the transition of the node on the basis of the transmission log data and the node definition data of the server. In addition, the server changes the value of the server-side setting information with the transition of the node and compares the value with the value of the corresponding terminal-side setting information recorded in the transmission log data. Here, in a case where these values are not the same, it means that the value of the terminal-side setting information of the terminal has deviated from a correct value. Therefore, in this case, there is a high possibility that some fraudulent activities would be performed in the terminal. Thus, the comparison between these values is equivalent to that the server determines whether fraudulent activities have been performed in the terminal. That is, according to the invention, it is possible to detect fraudulent activities and to perform a process of preventing/deterring fraudulent activities according to the detection of the fraudulent activities or a process of suppressing adverse effects caused by the fraudulent activities.

That is, according to the invention, it is possible to suppress a delay in the progress of the game and to improve resistance to fraudulent activities.

BRIEF DESCRIPTION OF DRAWINGS

FIG. 5 is a diagram showing an example of node definition data.

FIG. 6 is a diagram showing a transition of a node of the bonus game.

FIG. 7 is a diagram showing content of a record in a node definition data management database.

FIG. 9 is a diagram showing content of node-related information.

FIG. 10 is a diagram showing content of a record in a running game management database.

DESCRIPTION OF EMBODIMENTS

Hereinafter, an embodiment of the invention will be described with reference to the drawings.

Outline of this Embodiment

Figure 1:
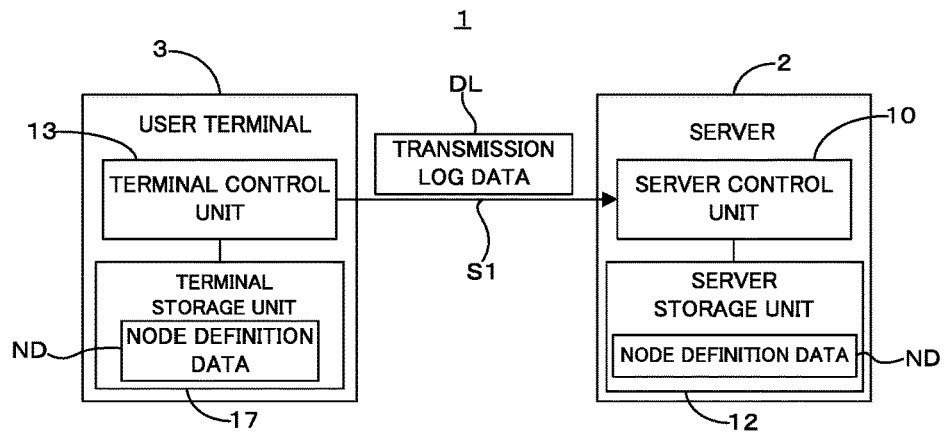
FIG. 1 is a diagram showing main units of a control system.

First, an outline of this embodiment will be described. FIG. 1 is a diagram showing main units of a control system 1. As shown in FIG. 1, the control system 1 includes a server 2 and a user terminal 3 (terminal) that can communicate with the server 2. The server 2 and the user terminal 3 provide a game in cooperation with each other. The server 2 includes a server control unit 10. The user terminal 3 includes a terminal control unit 13. Both the server control unit 10 and the terminal control unit 13 execute a process through cooperation between hardware and software. For example, in the server control unit 10, a processing device including a CPU reads a program stored in a ROM or other storage units and executes the program to perform a process. In addition, the server 2 includes a server storage unit 12 that stores data. The user terminal 3 includes a terminal storage unit 17 that stores data.

Before the game is provided, a state is established in which each of the server 2 and the user terminal 3 can use common node definition data ND corresponding to the game. A plurality of nodes indicating the state of the game are defined in the node definition data ND. The terminal control unit 13 of the user terminal 3 transitions the node on the basis of the node definition data ND of the user terminal 3 and changes a value of terminal-side setting information corresponding to the node definition data ND of the user terminal 3 with the transition of the node while the game is being played by the user. In addition, the terminal control unit 13 records transition reproduction information that can reproduce the transition of the node and the value of the terminal-side setting information changed with the transition of the node as a log LG in log data LD. Further, in a case where a log transmission condition related to the transmission of the log LG is established, the terminal control unit 13 transmits transmission log data DL including the log LG recorded in the log data LD to the server 2 (Step S1).

The server control unit 10 of the server 2 reproduces the transition of the node on the basis of the transition reproduction information of the transmission log data DL and the node definition data ND of the server 2. In addition, the server control unit 10 executes a verification process that changes a value of server-side setting information corresponding to the node definition data ND of the server with the transition of the node and compares the value of the server-side setting information with the value of the corresponding terminal-side setting information recorded in the transmission log data DL. According to the configuration of the control system 1, it is possible to suppress a delay in the progress of the game and to improve resistance to fraudulent activities.

Details of this Embodiment

Figure 2:
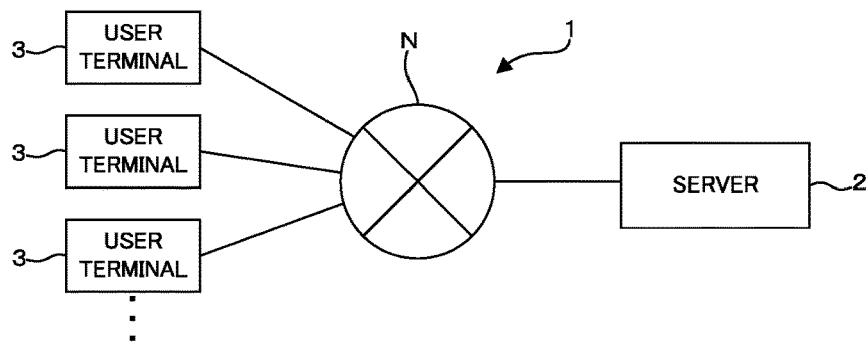
FIG. 2 is a diagram showing a configuration of the control system.

Next, details of this embodiment will be described. FIG. 2 is a diagram showing an example of a configuration of the control system 1 according to this embodiment. As shown in FIG. 2, the control system 1 is configured to include the server 2 (computer) and one or more user terminals 3 (terminals or computers). The server 2 and the user terminal 3 can communicate with each other via a network N including the Internet, a telephone network, and other communication networks. The server 2 and the user terminal 3 provide the game to the user in cooperation with each other.

Figure 3:
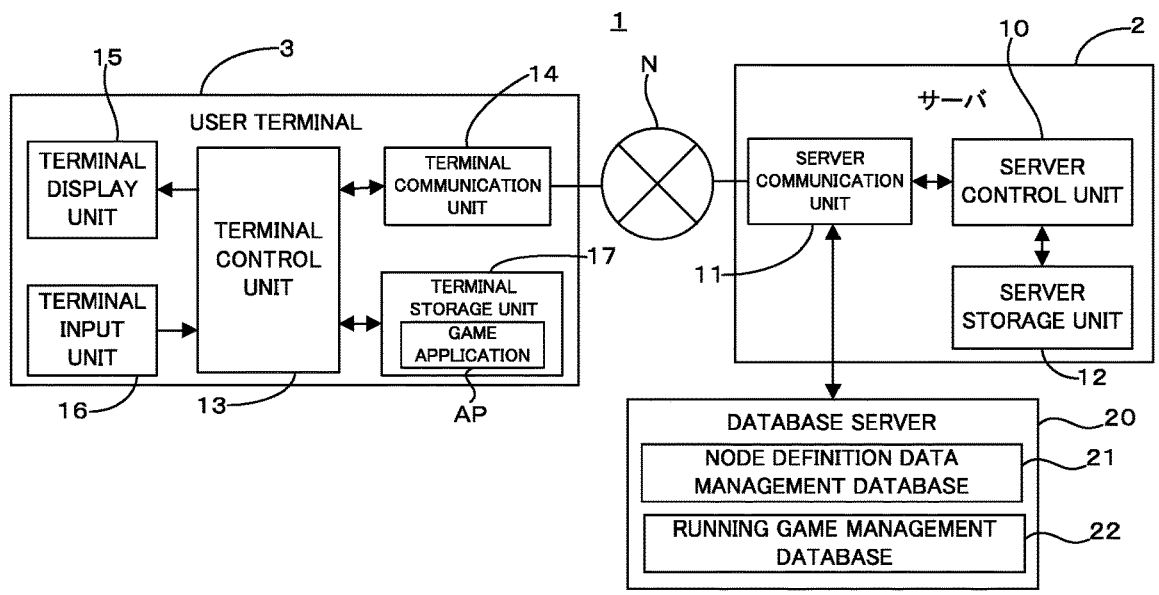
FIG. 3 is a block diagram showing an example of functional configurations of a server and a user terminal.

The server 2 provides a service related to the game (hereinafter, referred to as "this service"). In the game according to this embodiment, the user terminal 3 provides a screen and receives an operation performed by the user. Further, in the game, predetermined information related to the game is stored in the server 2, and communication is performed between the user terminal 3 and the server 2 while the game is being played. In FIG. 2 and FIG. 3 which will be described below, the server 2 is represented by one block. However, this does not mean that the server 2 is configured by a single server apparatus. For example, the server 2 may be configured by a plurality of server apparatuses. In this case, the server apparatuses constituting the server 2 may include a Web server or a Web application server. In particular, in some cases, a plurality of server apparatuses having the same function are provided for load distribution, communication facilitation, and other purposes to configure a system. In the case of this configuration, requests are distributed to each server apparatus by, for example, a load balancer. In the case of this configuration, the server 2 may be one or more of the plurality of server apparatuses.

The user terminal 3 is a terminal used by the user. The user means a person who can play the game provided by the control system 1. The user terminal 3 means a terminal used by the user for convenience and does not mean a terminal used exclusively by the user. The user terminal 3 may be of any type. For example, a tablet computer (including a so-called smartphone), a desktop computer, a notebook computer, a game machine, or a wearable terminal can function as the user terminal 3.

FIG. 3 is a block diagram showing an example of functional configurations of the server 2 and the user terminal 3. As shown in FIG. 3, the server 2 includes the server control unit 10, a server communication unit 11, and the server storage unit 12 as the functional configurations. The user terminal 3 includes the terminal control unit 13, a terminal communication unit 14, a terminal display unit 15, a terminal input unit 16, and the terminal storage unit 17 as the functional configurations.

The server control unit 10 of the server 2 includes a processing device and a primary storage device. The processing device is a device having an information processing function and includes a CPU. The CPU includes a control device, an arithmetic device, a register, and a cache memory. The primary storage device includes a DRAM and other volatile memories. In the server control unit 10, the processing device reads a program stored in the server storage unit 12 (another storage area may be used) into the primary storage device and executes the program to execute a process. That is, the server control unit 10 executes the process through cooperation between hardware and software. The server communication unit 11 includes a communication device having a function of communicating with an external apparatus. The communication device includes a communication control device and a network interface. The server communication unit 11 communicates with the external apparatus using the communication device under the control of the server control unit 10. In the following description, it is assumed that the communication of the server 2 using the network N and other types of communication are appropriately performed by the server communication unit 11, and a detailed description thereof will be omitted. The server storage unit 12 includes a hard disk drive (other magnetic storage devices may be used), a ROM, a flash memory, and other non-volatile memories. The server storage unit 12 stores data in the non-volatile memory.

As shown in FIG. 3, a database server 20 is connected to the server communication unit 11. The database server 20 stores a node definition data management database 21 and a running game management database 22. Hereinafter, the node definition data management database 21 is referred to as a "data management DB", and the running game management database 22 is referred to as a "game management DB". The server control unit 10 can access the data management DB and the game management DB. FIG. 3 is a diagram showing that the server 2 and the database server 20 are directly connected to each other. However, the connection form between the server 2 and the database server 20 is not limited. The server 2 and the database server 20 may be connected via the network N, may be connected via a LAN, or may be directly connected wirelessly or in a wired manner.

The terminal control unit 13 of the user terminal 3 includes a processing device having an information processing function and a primary storage device. In the terminal control unit 13, the processing device reads a program stored in the terminal storage unit 17 (other storage areas may be used) into the primary storage device and executes the program to perform a process. That is, the terminal control unit 13 performs information processing through cooperation between hardware and software. The terminal communication unit 14 includes a communication device having a communication control device and a network interface. The terminal communication unit 14 communicates with an external apparatus using the communication device under the control of the terminal control unit 13. In the following description, it is assumed that the communication of the user terminal 3 using the network N and other types of communication are appropriately performed by the terminal communication unit 14, and a detailed description thereof will be omitted. The terminal display unit 15 includes a liquid crystal panel, an organic EL panel, and other display devices. The terminal display unit 15 displays images on the display device under the control of the terminal control unit 13. The terminal input unit 16 includes a keyboard, a mouse, a touch panel, and other input devices. The terminal input unit 16 detects an input to the input device and outputs a detection result to the terminal control unit 13. The terminal storage unit 17 includes a non-volatile memory. The terminal storage unit 17 stores data in the non-volatile memory.

As shown in FIG. 3, an application AP related to the game (hereinafter, referred to as a "game application AP") has been downloaded to the user terminal 3. Hereinafter, the game corresponding to the game application AP is referred to as "this game". The game application AP is, for example, an application for a smartphone. In this case, the game application AP is downloaded to the user terminal 3 using, for example, an application download service. The game application AP has a function of providing various screens related to this game, a function of receiving an operation performed by the user and executing a process corresponding to the operation, a function of transmitting and receiving various types of information to and from the server 2, and a function of executing other processes related to this game.

Figure 4:
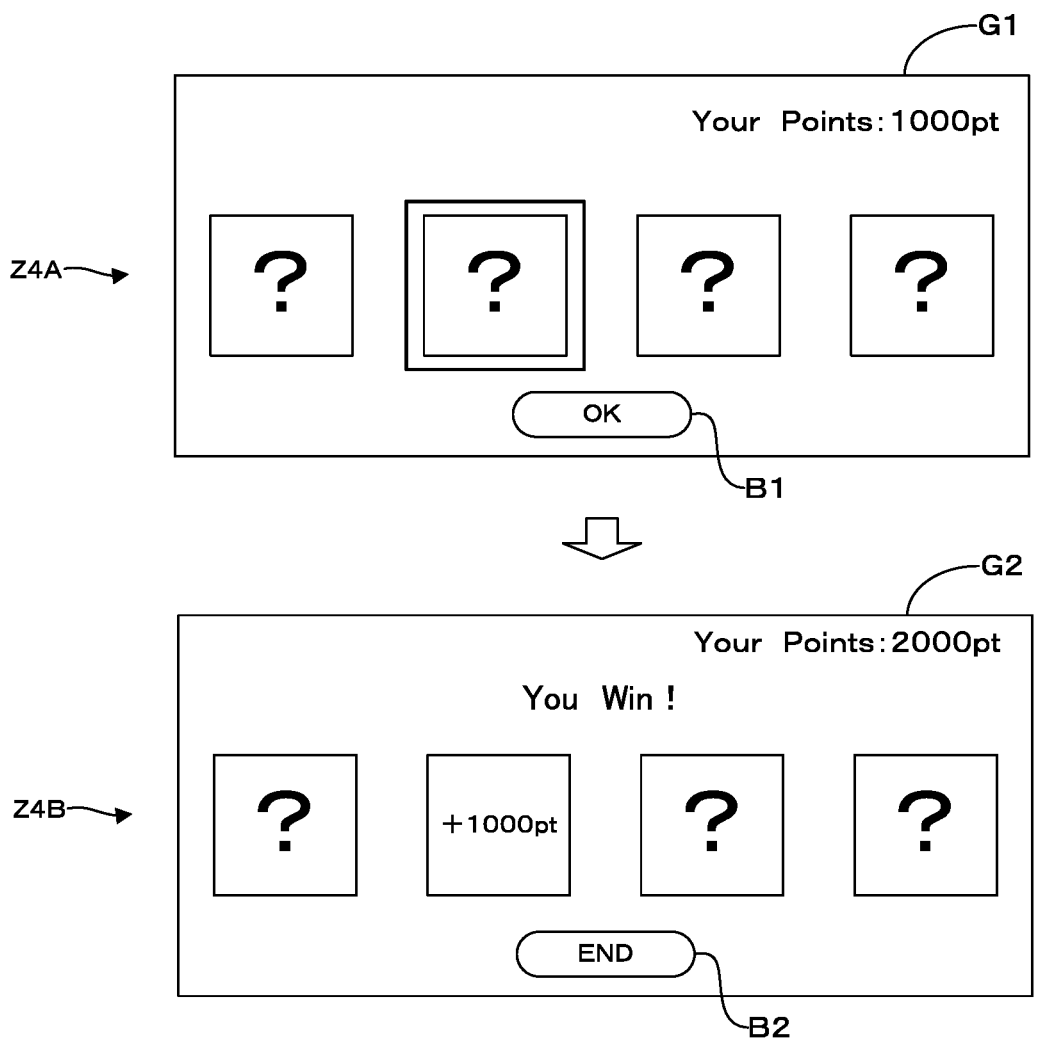
FIG. 4 is a diagram showing a screen of a bonus game.

In this embodiment, the following bonus game may be used as an example. For example, the bonus game is started in this game, using the generation of a predetermined event as a trigger, when the user is playing this game. Hereinafter, an example in which the bonus game is used is referred to as "this example". FIG. 4 is a diagram used to describe the bonus game. The user has points for the bonus game. The unit of points is "pt". As represented by reference numeral Z4A in FIG. 4, in the bonus game, a pre-selection screen G1 is first displayed on the terminal display unit 15. Back sides of four cards are drawn on the pre-selection screen G1. The content of the card is a win or a loss. When the user selects a winning card, a point balance increases by 1000 pt. When the user selects a losing card, the point balance remains unchanged. The user designates one of the four cards using a cursor and operates a confirmation button B1 to select one card. Then, as represented by reference numeral Z4B, a post-selection screen G2 that clearly indicates whether the card selected by the user is the winning card or the losing card is displayed on the terminal display unit 15. In addition, the point balance of the user changes depending on whether the selected card is the winning card or the losing card. The user checks the content of the screen and operates an end button B2 in a case where the user ends the bonus game.

Here, in the game provided by the cooperation between the terminal and the server, fraudulent activities may be performed. For the bonus game, in a case where there are no measures, fraudulent activities, such as increasing the point balance when the losing card is selected or increasing the point balance by 100000 pt when the winning card is selected, can be performed. The fraudulent activities are typically performed by modifying the program of the terminal (in this embodiment, the game application AP or a program associated therewith) or by tampering with communication between the terminal and the server. As will be clear below, in the control system 1 according to this embodiment, resistance to the fraudulent activities is improved.

As will be clear below, for the bonus game, the corresponding node definition data ND (which will be described below) is used to progress the game. Hereinafter, the game progressed by using the node definition data ND, such as the bonus game, is referred to as a "unit game". In this embodiment, before a situation in which the user can play the unit game, the node definition data ND corresponding to the unit game is uploaded to the server 2 and stored in the data management DB. Note that "before the situation in which the user can play the unit game" means, for example, before the corresponding game application AP is released or before the unit game can be played by the update of this game. Hereinafter, an example of a flow until the node definition data ND corresponding to the unit game is stored in the data management DB will be described.

First, a person who develops this game creates the node definition data ND corresponding to the unit game. Hereinafter, the person who develops this game is referred to as a "developer". FIG. 5 is a diagram showing that the content of the node definition data ND corresponding to the bonus game is simplified in an aspect suitable for description. Hereinafter, the node definition data ND corresponding to the bonus game is referred to as "this node definition data NDa". The node definition data ND is data/file used to progress the unit game. The node definition data ND is used at least to manage the node of the unit game and to manage the state of a predetermined item related to the unit game. The node means a possible state of the unit game. Here, the state means each state that is expressed by a state transition diagram (state machine diagram). Hereinafter, the "state of the unit game" managed as the node is referred to as a "game state".

FIG. 6 is a state transition diagram related to the node defined by this node definition data NDa shown in FIG. 5. As shown in FIG. 6, in this example, when the bonus game is started, the game state is transitioned to a standby node. In a case where a card selection event is generated when the game state is the standby node, the game state is transitioned to a lottery node. For the transition of the node, an event means a phenomenon (trigger event) that triggers the transition of the node. A parameter can be added to the event. The parameter is, for example, an argument passed to a program/function that is executed after the execution of the event. In a case where a lottery completion event is generated when the game state is the lottery node, the game state is transitioned to the standby node. In a case where an end event is generated when the game state is the standby node, the game state is transitioned to an end node. When the game state is transitioned to the end node, the bonus game ends. The content of each node and each event will be clear below. In this example, the bonus game progresses with the transition of the node according to the transition of the state shown in FIG. 6.

State variable information can be defined in the node definition data ND. In the state variable information, state variables indicating the states of predetermined items related to the unit game are defined. As shown in FIG. 5, in this node definition data NDa, the number of selections <item>, a point balance <item>, and a lottery result <item> are defined as the state variables. Note that, in this embodiment, the expression "<item>" indicates that the corresponding term is an item/variable having a value. A value indicating the number of times the user has selected a card in the bonus game is stored in the number of selections <item>. A value indicating the point balance of the user is stored in the point balance <item>. A value indicating the result of card selection is stored in the lottery result <item>.

Further, initial node information is defined in the node definition data ND. A node (hereinafter, referred to as an "initial node"), to which the game state is to be transitioned first when the unit game is started, is defined in the initial node information. As shown in FIG. 5, the standby node is defined as the initial node in this node definition data NDa. In addition, individual node information for each of a plurality of nodes is defined in the node definition data ND. The definition of the individual node definition information in the node definition data ND corresponds to the definition of the node in the node definition data ND. Accepted event information, information of a process at the time of transition, and information of an event to be issued at the time of completion can be defined in the individual node definition information.

An event that is accepted when the game state remains in this node is defined in the accepted event information. The type, name, and other identification information of the event are described in the accepted event information such that the event is defined. Hereinafter, the event defined in the accepted event information is referred to as an "accepted event". When the game state remains in one node, in a case where the accepted event defined in the one node is generated, the transition from the one node to another node is performed according to transition rules which will be described below.

A process at the time of transition, which is a process executed in the case of the transition to this node, is defined in the information of the process at the time of transition. Identification information (for example, a function name) of a program corresponding to the process at the time of transition is described in the information of the process at the time of transition to define the process at the time of transition. In addition, the program (script) corresponding to the process at the time of transition is directly described in the information of the process at the time of transition to define the process at the time of transition. The process at the time of transition can include a process of changing the value of the state variable. In a case where the game state is transitioned from one node to another node, when one or more processes at the time of transition are defined in another node, each of the defined processes at the time of transition is executed.

An event to be issued after the game state is transitioned to this node and then the execution of each of the processes at the time of transition defined in this node is completed is defined in the information of the event to be issued at the time of completion. However, in a case where the process at the time of transition is not defined in this node, the process at the time of transition is not executed after the transition to this node, and the event defined in the information of the event to be issued at the time of completion is issued. The type, name, and other identification information of the event are described in the information of the event to be issued at the time of completion to define the event. Hereinafter, the event defined in the information of the event to be issued at the time of completion is referred to as an "event to be issued at the time of completion". In a case where the game state is transitioned from one node to another node, when the process at the time of transition is defined in another node, the process at the time of transition is executed. When the process at the time of transition is not defined in another node, the process at the time of transition is not executed.

Then, when the event to be issued at the time of completion is defined in another node, the event to be issued at the time of completion is issued. Note that, in this embodiment, for convenience of description, it is assumed that the event to be issued at the time of completion is not defined in the initial node. That is, in this embodiment, the event to be issued at the time of completion is not issued with the transition to the initial node.

As shown in FIG. 5, the individual node information of each of the standby node, the lottery node, and the end node is defined in this node definition data NDa. That is, the standby node, the lottery node, and the end node are defined in this node definition data NDa. Focusing on the standby node, a card selection event and an end event are defined as the accepted events in the standby node. This means that, in a case where the card selection event or the end event is generated when the game state is the standby node, the game state is transitioned to another node according to the transition rules which will be described below. In addition, the process at the time of transition and the event to be issued at the time of completion are not defined in the standby node. This means that, after the bonus game is transitioned to the standby node, the process at the time of transition is not executed and the event to be issued at the time of completion is not issued. Further, focusing on the lottery node, the lottery completion event is defined as the accepted event in the lottery node. This means that, in a case where the lottery completion event is generated when the game state is the lottery node, a transition to another node is made according to the transition rules which will be described below. Furthermore, a lottery process is defined as the process at the time of transition in the lottery node. This means that the lottery process is executed when the game state is transitioned to the lottery node. Moreover, the lottery completion event is defined as the event to be issued at the time of completion in the lottery node. This means that the lottery completion event is issued after the game state is transitioned to the lottery node and then the lottery process is completed.

Transition rule information is defined in the node definition data ND. The transition rules, which are rules related to the transition of the node, are defined in the transition rule information. The event (trigger event) that triggers the transition of the node and an aspect of the transition of the node when the event is generated are defined in the transition rules. In this embodiment, a combination of the node before transition (identification information indicating the node), the event that triggers the transition of the node (identification information indicating the event), and the node after transition (identification information indicating the node) is defined in the transition rules. For example, it is assumed that, in a transition rule JA, a node NA is defined as the node before transition, an event IV is defined as the event that triggers the transition of the node, and a node NB is defined as the node after transition. In this case, the transition rule JA indicates that, in a case where the event IV is generated when the game state is the node NA, the game state is transitioned from the node NA to the node NB.

As shown in FIG. 5, transition rules J1 to J3 are defined in this node definition data NDa. In the transition rule J1, the standby node is defined as the node before transition, the card selection event is defined as the event that triggers the transition of the node, and the lottery node is defined as the node after transition. The transition rule J1 indicates that, in a case where the card selection event is generated when the game state is the standby node, the game state is transitioned from the standby node to the lottery node. The content of the transition rules J2 and J3 is as shown in FIG. 5. In FIG. 6, the corresponding transition rules are clearly shown in association with the events that trigger the transition of the node.

In this embodiment, the node definition data ND is a program file in which a program is described in a predetermined programming language. Various types of information are described in the node definition data ND in the predetermined programming language. The predetermined programming language is a dedicated programming language specialized for the node definition data ND. However, the predetermined programming language may be HTML or other existing programming languages. For example, the developer creates the node definition data ND using a tool or software development kit provided by an administrator of the server 2. Note that, in this embodiment, the node definition data ND is a program file in which information is described by a program. However, the node definition data ND may not be a program file, but may be data in which information is described in JSON or other description formats. In addition, the node definition data ND may be data in which information is described in a unique format. Further, one node definition data item ND may be configured to refer to one or more other node definition data items ND. In this case, a combination of a plurality of node definition data items ND functions as "node definition data". Note that the node definition data ND is data in which information related to the transition of a state is recorded and can be said to correspond to a state machine.

After creating the node definition data ND, the developer uploads the data to the server 2. The server 2 provides the developer with a means for uploading the node definition data ND. When the node definition data ND is uploaded, the server control unit 10 of the server 2 executes the following process. That is, the server control unit 10 generates a data ID with a unique value that identifies the uploaded node definition data ND. Then, the server control unit 10 registers a record including the generated data ID and the uploaded node definition data ND in the data management DB of the database server 20. However, instead of the node definition data ND, an address of a storage location of the data, a path to the storage location of the data, and other information for accessing the data may be stored in the record. FIG. 7 shows the content of one record in the data management DB. Further, the server control unit 10 notifies the developer of the generated data ID using a predetermined method. As a result of the above-described process, the record in which the data ID and the node definition data ND have been associated with each other is registered in the data management DB before the situation in which the user can play the unit game. In addition, the developer is notified of the data ID.

The above is an example of a flow until the node definition data ND is stored in the data management DB. However, the described flow is only an example, and the node definition data ND may be stored in the data management DB in a flow different from the described flow. In this embodiment, the record including the data ID and the node definition data ND is registered for each unit game in the data management DB. Note that the developer and other authorized persons can change the content of the node definition data ND stored in the data management DB.

Figure 8:
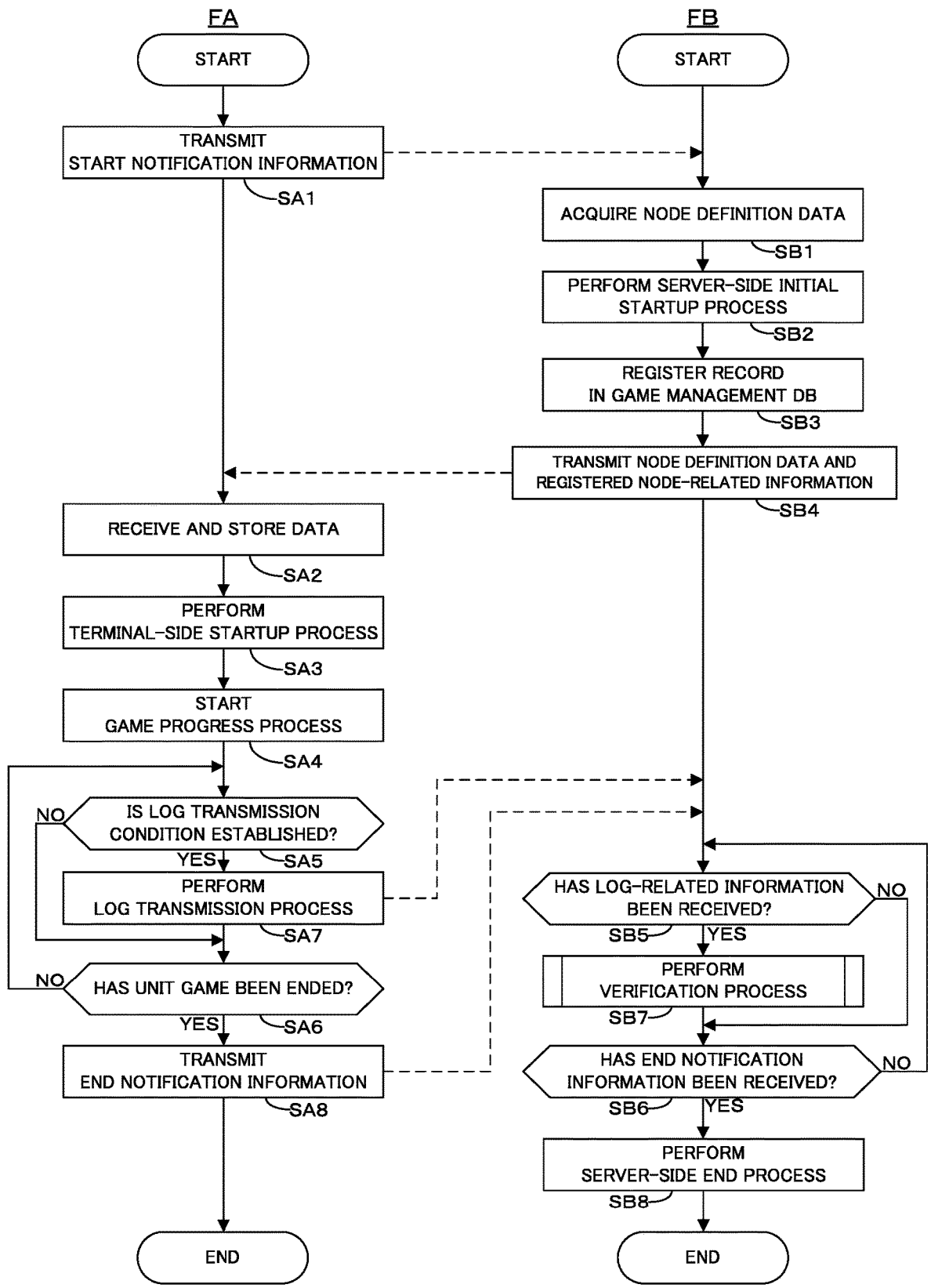
FIG. 8 is a flowchart showing a control method executed by the control system.

Next, the operation of the control system 1 will be described. Hereinafter, particularly, the operation of the control system 1 in a case where the user plays the unit game will be described. FIG. 8 is a flowchart showing an example of the operation of the control system 1 for a period for which the unit game is being played. In FIG. 8, a flowchart FA shows an example of the operation of the user terminal 3, and a flowchart FB shows an example of the operation of the server 2. It is assumed that, at the time of the start of the flowchart of FIG. 8, the game application AP has been started in the user terminal 3 and the user is playing this game. Hereinafter, in this example, the user who plays the bonus game is particularly referred to as a "user of interest". Therefore, it is assumed that the point balance of the user of interest is 1000 pt at the time before the user of interest plays the bonus game.

As shown in the flowchart FA, in a case where an event that triggers the start of the unit game is generated in this game, the terminal control unit 13 of the user terminal 3 transmits start notification information notifying the start of the unit game to the server control unit 10 (Step SA1). The start notification information includes the data ID of the node definition data ND corresponding to the unit game. As described above, in this embodiment, the node definition data ND is stored in the data management DB in association with the data ID for each unit game. Therefore, when the unit game is started in the user terminal 3, the terminal control unit 13 transmits the data ID of the node definition data ND corresponding to the unit game to the server control unit 10.

As shown in the flowchart FB, when receiving the start notification information, the server control unit 10 of the server 2 acquires the corresponding node definition data ND (Step SB1). Specifically, the server control unit 10 specifies a record corresponding to the data ID included in the start notification information with reference to the data management DB. Then, the server control unit 10 acquires the node definition data ND of the specified record. As described above, the server control unit 10 can acquire any node definition data ND stored in the data management DB. This means that the server control unit 10 is in a state in which it can use any node definition data ND stored in the data management DB.

After the process in Step SB1, the server control unit 10 executes a server-side initial startup process (Step SB2). Specifically, first, the server control unit 10 generates an instance of the node definition data ND acquired in Step SB1. The "generation of the instance of the node definition data ND" means securing an area for the node definition data ND in the primary storage device or other memory areas such that the server control unit 10 can execute the process based on the node definition data ND. As described above, in this embodiment, the node definition data ND functions as a class that is the basis of the instance.

When the instance of the node definition data ND is generated, an area is secured in the memory for each item of node-related information corresponding to the node definition data ND such that a value can be stored in each item. The node-related information is information that is used in the node definition data ND and the unit game corresponding to the node definition data. The node-related information includes a plurality of items/variables for which areas are secured in the memory with the generation of the instance of the node definition data ND. With the generation of the instance of the node definition data ND, the server control unit 10 can store a value in each item of the node-related information, update the value of each item, and refer to the value of each item.

FIG. 9 is a diagram showing the content of the node-related information. As shown in FIG. 9, in this embodiment, the node-related information includes a running game ID <item>, a random number seed <item>, the number of node transitions <item>, a current node <item>, and each of the state variables defined in the node definition data ND. In FIG. 9, the state variables are expressed as a first state variable, a second state variable, and so on. After the initial values are stored in the running game ID <item> and the random number seed <item>, the values of the items do not change. Each of the number of node transitions <item>, the current node <item>, and the state variables is an item whose value can change with the progress of the unit game. Hereinafter, these items are collectively referred to as setting information. Among the items of the setting information, the number of node transitions <item> and the current node <item> are items that are not defined as the state variables. Hereinafter, these items are collectively referred to as management information. Hereinafter, in some cases, the "value of each item of the node-related information" is simply expressed as a "value of node-related information". The same applies to other types of information that include a plurality of items.

After generating the instance of the node definition data ND, the server control unit 10 sets an initial value for each item of the node-related information. Specifically, a running game ID, which is identification information of the generated instance, is stored in the running game ID <item>. The server control unit 10 generates the running game ID with a unique value and stores the running game ID as the initial value in the running game ID <item>. A random number seed is stored in the random number seed <item>. The random number seed is a value that is input to the random number generator when the random number generator generates random numbers. In this embodiment, the random number generator is a module that generates the random numbers using a recurrence formula and can continuously output the random numbers from one random number seed. In this embodiment, the server 2 and the user terminal 3 can use a common random number generator for the unit game. The use of the common random number generator means that the recurrence formulas corresponding to the random number generators are the same. Therefore, for the common random number generator, when the input value is the same, the output value is the same. Hereinafter, the random number generator that is used by the server 2 for the unit game is referred to as a "server-side random number generator". The server-side random number generator is stored in, for example, the database server 20 and is also stored in, for example, the server storage unit 12. Further, the random number generator that is used by the user terminal 3 for the unit game is referred to as a "terminal-side random number generator". The server control unit 10 generates the random number seed using a program having a function of generating random values in a predetermined format and stores the random number seed as the initial value in the random number seed <item>.

The number of node transitions indicating the number of node transitions while the unit game is being played is stored in the number of node transitions <item>. The server control unit 10 stores the number of node transitions indicating 0 as the initial value in the number of node transitions <item>. Current node information indicating a node (hereinafter, referred to as a "current node") in which the game state is currently staying is stored in the current node <item>. The server control unit 10 stores a dummy value indicating that no node transition has been performed as the initial value in the current node <item>. In addition, the server control unit 10 stores an appropriate initial value in each of the state variables. In this example, the server control unit 10 stores the number of selections indicating 0 in the number of selections <item>, stores a point balance indicating 1000 pt in the point balance <item>, and stores a dummy value indicating neither a win nor a loss in the lottery result <item>. Note that the server control unit 10 acquires the point balance of the user of interest from a user management database (not shown). The user management database is stored in the database server 20. Note that the value of each item of the node-related information is actually expressed in an appropriate expression format based on the defined data type.

The above is the server-side initial startup process. The server-side initial startup process makes it possible for the server control unit 10 to execute a process on the basis of the node definition data ND, and the initial value is stored in each item of the node-related information corresponding to the generated instance. In the following description, the node definition data ND which is the basis of the instance generated by the server control unit 10 is referred to as "server-side node definition data NDs". In addition, the execution of the process by the server control unit 10 using the generated instance is expressed as the "execution of the process on the basis of the server-side node definition data NDs" or the "execution of the process using the server-side node definition data NDs". Further, the node-related information, the setting information, the management information, and the state variables corresponding to the instance generated by the server control unit 10 are called server-side node-related information, server-side setting information, server-side management information, and server-side state variables, respectively.

Note that, in the server-side initial startup process, not only the above-described process is executed, but also a process necessary for establishing a state in which the server control unit 10 can execute a process on the basis of the node definition data ND is appropriately executed. Even in a case where no particular description is made, a necessary process is performed to achieve the purpose of the process, and the same applies to other processes.

After the process in Step SB2, the server control unit 10 registers one new record in the game management DB (Step SB3). The registered record includes the value of each item of the server-side node-related information. However, in this stage, the value of each item of the server-side node-related information is the initial value. Hereinafter, for the node-related information included in the record of the game management DB, the node-related information, the setting information, the management information, and the state variables are referred to as registered node-related information, registered setting information, registered management information, and registered state variables, respectively. FIG. 10 shows the content of the record registered in the game management DB in Step SB3 in this example. Note that, in the example shown in FIG. 10, the value of the game running ID is "GM01" and the value of the random number seed is set to an appropriate value.

After the process in Step SB3, the server control unit 10 transmits the node definition data ND acquired in Step SB1 and the registered node-related information included in the record registered in the game management DB in Step SB3 to the terminal control unit 13 (Step SB4). Note that the transmission of the node definition data ND from the terminal control unit 13 to the server control unit 10 is performed by, for example, the downloading of the node definition data ND from the server 2 by the user terminal 3. After the process in Step SB4, the instance generated in the server-side initial startup process in Step SB2 is discarded.

As shown in the flowchart FA, the terminal control unit 13 receives the node definition data ND and the registered node-related information transmitted by the server control unit 10 in Step SB4 and stores each data item in the terminal storage unit 17 (Step SA2). The process in Step SA2 makes it possible for the terminal control unit 13 to use the node definition data ND. As described above, in this embodiment, before the unit game (game) is provided, a state is established in which each of the server 2 and the user terminal 3 can use the common node definition data ND corresponding to the unit game.

After the process in Step SA2, the terminal control unit 13 executes a terminal-side startup process (Step SA3). In Step SA3, the terminal control unit 13 generates an instance of the node definition data ND received in Step SA2 and establishes a state in which it can execute a process on the basis of the node definition data ND. With the generation of the instance, an area is secured for each item of the node-related information in the memory such that a value can be stored in each item. In the following description, the node definition data ND, which is the basis of the instance generated by the terminal control unit 13, is referred to as "terminal-side node definition data NDd" for convenience. In addition, the execution of the process by the terminal control unit 13 using the generated instance is expressed as the "execution of the process on the basis of the terminal-side node definition data NDd" or the "execution of the process using the terminal-side node definition data NDd". Further, the node-related information, the setting information, the management information, and the state variables corresponding to the instance generated by the terminal control unit 13 are referred to as terminal-side node-related information, terminal-side setting information, terminal-side management information, and terminal-side state variables, respectively. As will be clear below, the value of each item of the terminal-side setting information is updated by the terminal control unit 13 with the progress of the unit game.

The terminal control unit 13 initializes the value of the terminal-side node-related information on the basis of the registered node-related information received in Step SA2. The initialization of the value of the terminal-side node-related information on the basis of the registered node-related information means storing the value of each item of the received registered node-related information in each item of the terminal-side node-related information. As a result, the initial value is stored in each item of the terminal-side node-related information.

Figure 11:
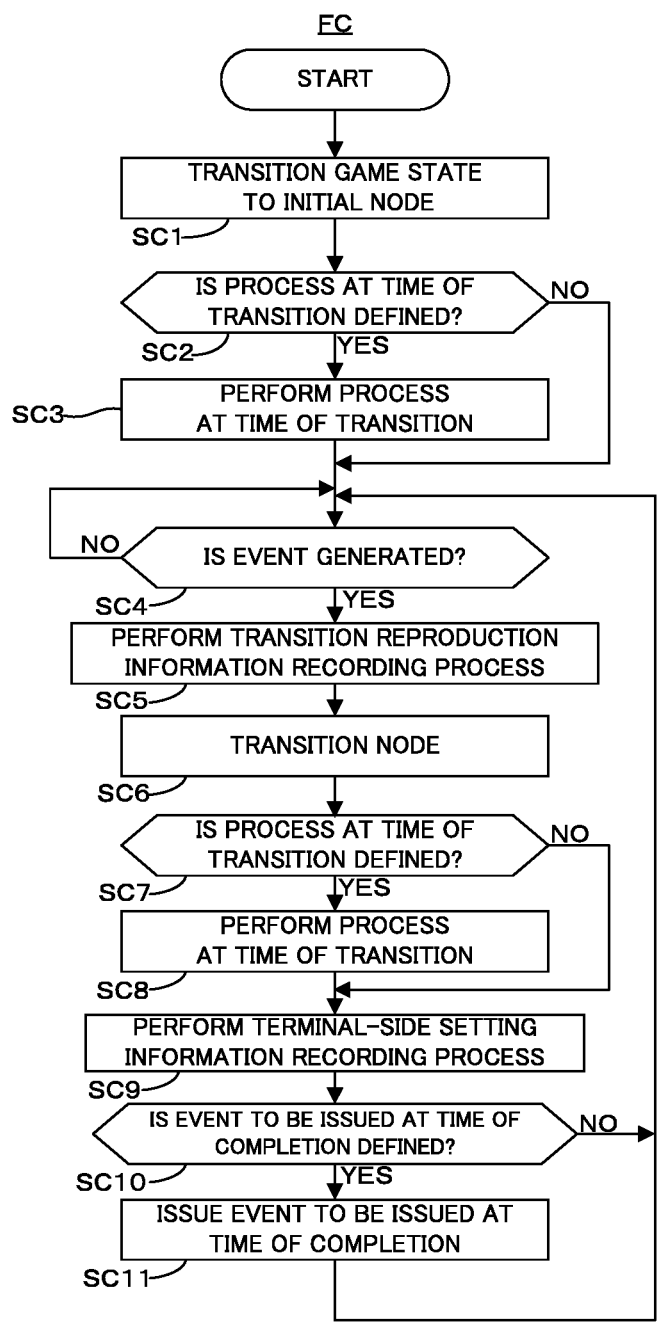
FIG. 11 is a diagram showing a control method executed by the terminal.

After the process in Step SA3, the terminal control unit 13 starts a game progress process (Step SA4). The game progress process is a process in which the terminal control unit 13 progresses the unit game using the terminal-side node definition data NDd. Hereinafter, the content of the game progress process will be described in detail. A flowchart FC of FIG. 11 shows the process executed by the terminal control unit 13 on the basis of the terminal-side node definition data NDd for the progress of the unit game. Note that, with the progress of the unit game, in addition to the process shown in the flowchart FC, the provision of various screens, the output of sound, the reception of an operation performed by the user, and other processes related to this game are naturally executed.

As shown in the flowchart FC of FIG. 11, the terminal control unit 13 transitions the game state of the unit game to the initial node on the basis of the initial node information of the terminal-side node definition data NDd (Step SC1). With the transition to the initial node, the terminal control unit 13 increments the value of the number of node transitions <item> which is the terminal-side management information and stores a value indicating the initial node in the current node <item>. Note that, in this embodiment, even in a case where no particular description is made, when there is a node transition, the values of the number of node transitions <item> and the current node <item> are updated. Then, the terminal control unit 13 determines whether the process at the time of transition is defined in the initial node (Step SC2). In a case where the process at the time of transition is defined (Step SC2: YES), the terminal control unit 13 executes the process at the time of transition (Step SC3). Note that, in a case where the process at the time of transition is a process that causes a change in the values of the state variables, the values of the state variables are updated with the execution of the process at the time of transition. This point also applies to the following description. After the process in Step SC3, the terminal control unit 13 advances a processing procedure to Step SC4. In a case where the process at the time of transition is not defined in the initial node (Step SC2: NO), the terminal control unit 13 advances the processing procedure to Step SC4.

In Step SC4, the terminal control unit 13 monitors whether the event that triggers the transition of the node has been generated. Note that, in some cases, the event to be issued at the time of completion that has been issued in Step SC11, which will be described below, is the event that triggers the transition of the node. In a case where the event that triggers the transition of the node has been generated (Step SC4: YES), the terminal control unit 13 executes a transition reproduction information recording process (Step SC5). The transition reproduction information recording process is a process of recording transition reproduction information that can reproduce the transition of the node as the log LG in the log data LD. The log data LD is generated with the start of the unit game and is stored in a predetermined storage area of the terminal storage unit 17. In particular, in this embodiment, when the event that triggers the transition of the node is generated, the transition reproduction information recording process is a process of recording event content information indicating the content of the generated event in the log data LD. In other words, in this embodiment, the event content information corresponds to the transition reproduction information.

For the recording of the event content information in the log data LD, the terminal control unit 13 records event timing information indicating the timing when the event was generated, information indicating that the type of the log is an event, and the event content information in the log data LD according to a format. In this embodiment, the event timing information is information indicating the date and time (date+time) when the event was generated. However, the event timing information may be any information that can check the time-series of the timing when the event was generated. This point similarly applies to state acquisition timing information which will be described below. The event content information includes identification information of the event. Further, in a case where a parameter is added to the event, the event content information includes the value of the added parameter.

In a case where it is determined in Step SC4 that the event has been generated (Step SC4: YES), the terminal control unit 13 further executes the following process. That is, the terminal control unit 13 transitions the node according to the transition rules defined in the terminal-side node definition data NDd (Step SC6). The terminal control unit 13 updates the terminal-side setting information with the transition of the node. After the process in Step SC6, the terminal control unit 13 determines whether the process at the time of transition is defined in the node after the transition (Step SC7). In a case where the process at the time of transition is defined (Step SC7: YES), the terminal control unit 13 executes the process at the time of transition (Step SC8) and advances the processing procedure to Step SC9. In a case where the process at the time of transition is not defined (Step SC7: NO), the terminal control unit 13 advances the processing procedure to Step SC9.

In Step SC9, the terminal control unit 13 executes a terminal-side setting information recording process. The terminal-side setting information recording process is a process of recording the value of the terminal-side setting information as a log in the log data LD. In particular, in this embodiment, the terminal control unit 13 records a state hash value, which is a hash value of the value of the terminal-side setting information, as the value of the terminal-side setting information in the log data LD. Specifically, the terminal control unit 13 acquires the value of each item of the terminal-side setting information at the current time. Each item of the terminal-side setting information includes the management information and the state variables. Then, the terminal control unit 13 generates data (hereinafter, referred to as "array data") in which the values of the items of the terminal-side setting information are arranged according to a rule (hereinafter, referred to as an "array rule"). Then, the terminal control unit 13 derives a hash value of the array data using a predetermined hash function. The hash value derived here is the state hash value. Then, the terminal control unit 13 records status acquisition timing information indicating the current time, information indicating that the type of the log is the terminal-side setting information, and the status hash value in the log data LD according to a format. As described above, in this embodiment, in a case where, after the transition of the node, the process at the time of transition is defined in the node after the transition, the terminal control unit 13 executes the process and then records the value of the terminal-side setting information (in this embodiment, the state hash value based on the value of the terminal-side setting information) as the log LG in the log data LD.

After the process in Step SC9, the terminal control unit 13 determines whether the event to be issued at the time of completion is defined in the node after the transition (Step SC10). In a case where the event to be issued at the time of completion is defined (Step SC10: YES), the terminal control unit 13 issues the event to be issued at the time of completion (Step SC11) and returns the processing procedure to Step SC4. In a case where the event to be issued at the time of completion is not defined (Step SC10: NO), the terminal control unit 13 returns the processing procedure to Step SC4.

Figure 12:
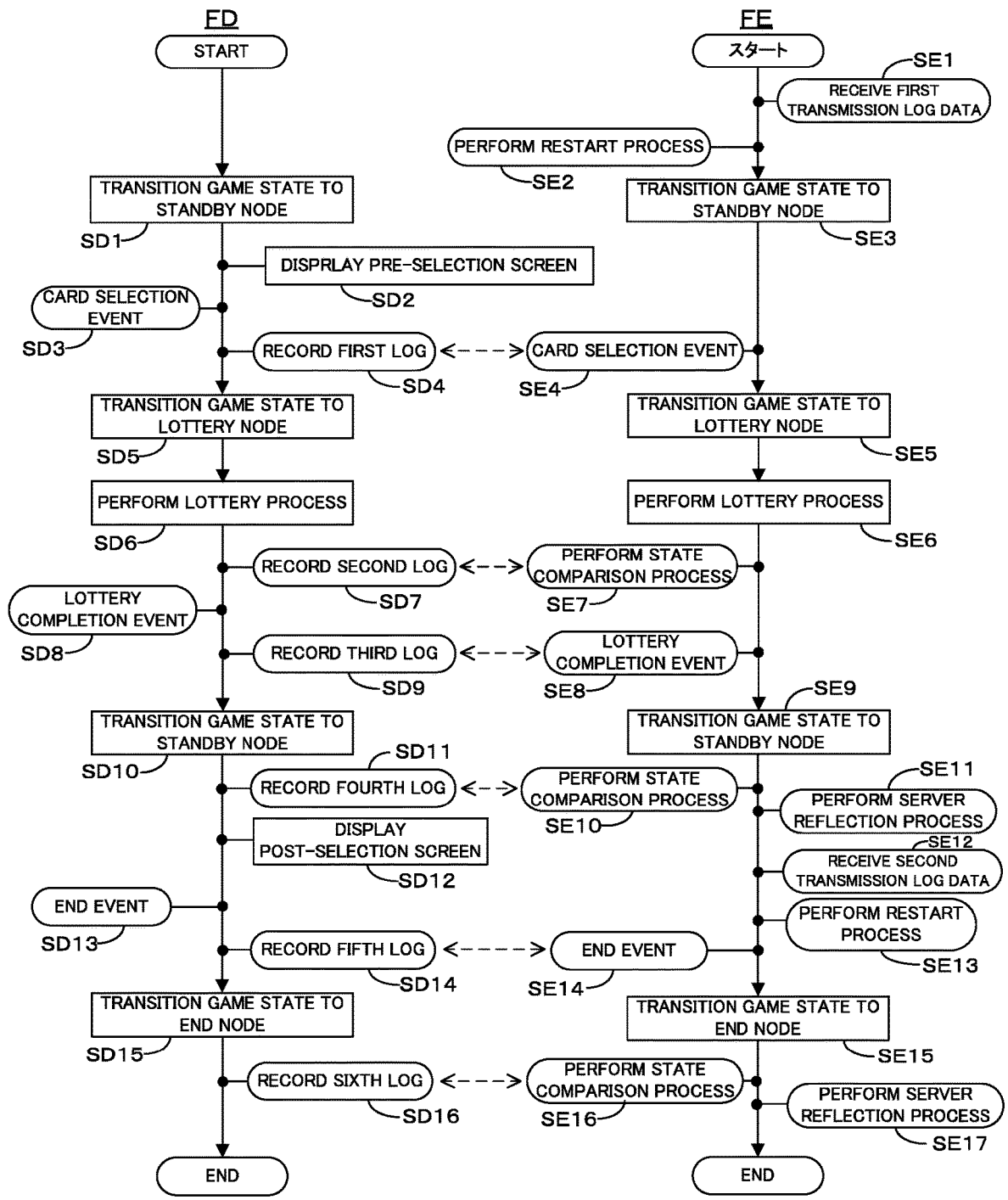
FIG. 12 is a diagram showing the control method executed by the terminal and a control method executed by the server.

Next, the game progress process executed by the user terminal 3 in this example will be described. A flowchart FD of FIG. 12 shows details of the game progress process according to this example. Note that, in the flowchart FD, for convenience of explanation, only the process of transitioning the node and the process at the time of transition are described on the main axis of the flowchart. In the flowchart FD, the process of generating an event, the transition reproduction information recording process, the terminal-side setting information recording process, and the process of displaying various screens are described in association with the main axis of the flow. In the flowchart FD, the content of the terminal-side node definition data NDd is the content of this node definition data NDa shown in FIG. 5.

As shown in the flowchart FD, the terminal control unit 13 transitions the game state of the bonus game to the standby node on the basis of the initial node information of the terminal-side node definition data NDd (Step SD1) With the transition to the standby node, the terminal control unit 13 increments the value of the number of node transitions <item> from 0 to 1 and further updates the value of the current node <item> to a value indicating the standby node. After the process in Step SD1, the terminal control unit 13 displays the pre-selection screen G1 (see FIG. 4) on the terminal display unit 15 using the function of the game application AP (Step SD2). In this embodiment, the game application AP is programmed such that, when the game state is transitioned to the standby node, a process of displaying a screen corresponding to the value of the number of selections <item>, which is the terminal-side state variable, is performed. In Step SD2, the terminal control unit 13 recognizes that the number of card selections is 0 with reference to the value of the number of selections <item> and displays the pre-selection screen G1. In addition, the terminal control unit 13 displays information indicating the point balance on the pre-selection screen G1 with reference to the value of the point balance <item> which is the terminal-side state variable. As described above, the terminal control unit 13 that executes the game application AP appropriately refers to the state variables while the unit game is being played. After displaying the pre-selection screen G1, the terminal control unit 13 monitors whether a confirmation button B1 on the screen has been operated by the user of interest.

Figure 13:
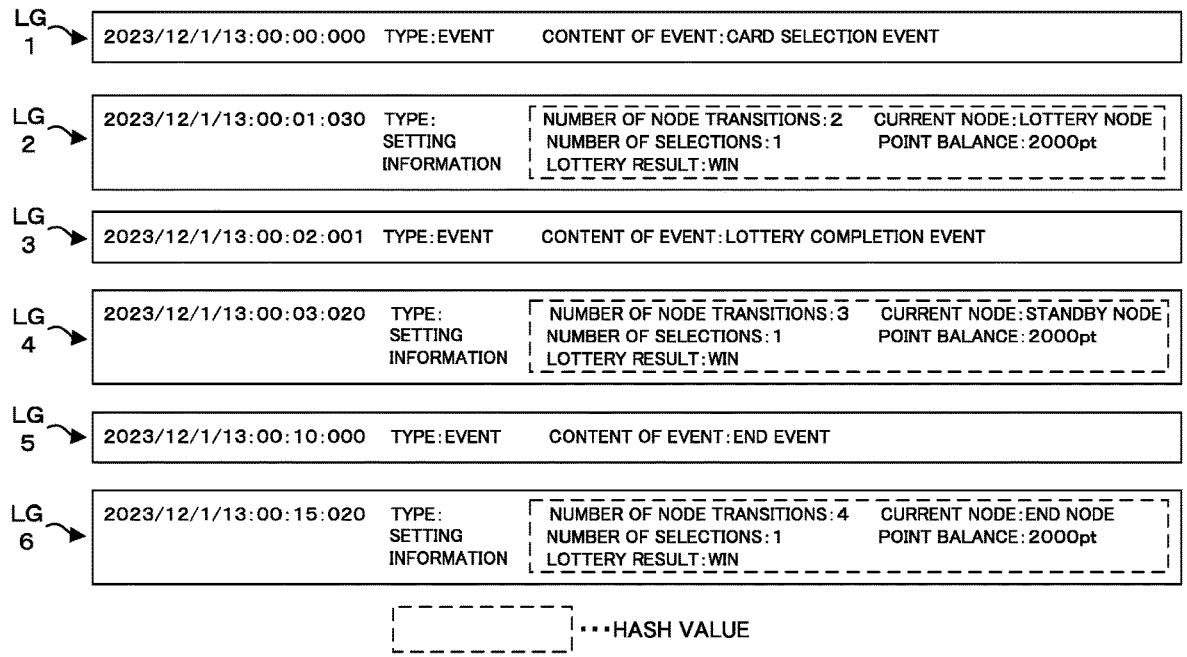
FIG. 13 is a diagram showing an example of a log.

Then, when the user of interest operates the confirmation button B1 on the pre-selection screen G1, the terminal control unit 13 issues a card selection event using the function of the game application AP (Step SD3). With the generation of the card selection event, the terminal control unit 13 executes the transition reproduction information recording process (Step SD4). In FIG. 13, reference numeral LG1 indicates the content of a first log that is newly recorded in the log data LD by the process in Step SD4. The first log LG1 includes event timing information indicating the timing when the card selection event in Step SD3 was generated, information indicating that the type of the first log LG1 is an event, and event content information indicating the content of the event generated in Step SD3.

Further, with the generation of the card selection event, the terminal control unit 13 transitions the game state to the lottery node on the basis of the transition rule J1 defined in the terminal-side node definition data NDd (Step SD5). The terminal control unit 13 appropriately updates the terminal-side setting information with the transition to the lottery node. With the transition to the lottery node, the terminal control unit 13 executes the lottery process defined as the process at the time of transition to the lottery node (Step SD6). The lottery process is a process in which the terminal control unit 13 determines the result of card selection using the terminal-side random number generator and the random number seed included in the registered node-related information received in Step SA2 of the flowchart FA. Hereinafter, the lottery process will be described in detail.

In the lottery process, the terminal control unit 13 inputs the random number seed received in Step SA2 to the terminal-side random number generator and obtains the output value (random number) of the terminal-side random number generator. Then, the terminal control unit 13 determines the result of card selection from the output value according to a predetermined rule (hereinafter, referred to as a "lottery rule"). As a very simplified example, for example, the random number generator is configured to output any one of four integers of 0, 1, 2, and 3, in response to the input of the random number seed. In this case, the lottery rule is a rule in which the result of card selection is a win when the output value is 0 or 1 and is a loss when the output value is 2 or 3.

After determining the result of card selection, the terminal control unit 13 updates the values of necessary items in the terminal-side setting information. Specifically, the terminal control unit 13 increments the value of the number of selections <item>, updates the value of the point balance <item> on the basis of the result of card selection, and stores a value indicating the result of card selection in the lottery result <item>. In this example, it is assumed that the result of card selection is determined to be a win. Therefore, in this example, the terminal control unit 13 sets the value of the number of selections <item> to "1", sets the value of the point balance <item> to "2000 pt", and stores a value indicating the win in the lottery result <item>. As described above, in a case where the process of using the random number is executed with the transition of the node, the terminal control unit 13 executes the process using the random number seed received from the server 2 and the random number generator of the user terminal 3.

After the process in Step SD6, the terminal control unit 13 executes the terminal-side setting information recording process (Step SD7). In FIG. 13, reference numeral LG2 indicates the content of a second log that is newly recorded in the log data LD by the process in Step SD7. State acquisition timing information indicating the current time, information indicating that the type of the log LG is the terminal-side setting information, and a state hash value based on the value of each item of the terminal-side setting information at the current time are recorded in the second log LG2.

After the process in Step SD7, the terminal control unit 13 issues a lottery completion event defined as the event to be issued at the time of completion to the lottery node (Step SD8). With the generation of the lottery completion event, the terminal control unit 13 executes the transition reproduction information recording process (Step SD9). In FIG. 13, reference numeral LG3 indicates the content of a third log that is newly recorded in the log data LD by the process in Step SD9. With the generation of the lottery completion event, the terminal control unit 13 transitions the game state to the standby node on the basis of the transition rule J2 defined in the terminal-side node definition data NDd (Step SD10). The terminal control unit 13 appropriately updates the terminal-side setting information with the transition to the standby node. With the transition to the standby node, the terminal control unit 13 executes the terminal-side setting information recording process (Step SD11). In FIG. 13, reference numeral LG4 indicates the content of a fourth log that is newly recorded in the log data LD by the process in Step SD11. With the transition to the standby node, the terminal control unit 13 further displays the post-selection screen G2 (see FIG. 4) on the terminal display unit 15 (Step SD12). The terminal control unit 13 recognizes that the number of card selections is one with reference to the value of the number of selections <item>, which is the terminal-side state variable, and displays the post-selection screen G2. In addition, with reference to the value of the point balance <item> and the lottery result <item> which are the terminal-side state variables, the terminal control unit 13 sets the content of the post-selection screen G2 to content based on these values. After displaying the post-selection screen G2, the terminal control unit 13 monitors whether an end button B2 of the screen has been operated by the user of interest.

Then, when the user of interest selects the end button B2 of the post-selection screen G2, the terminal control unit 13 issues an end event using the function of the game application AP (Step SD13). With the generation of the end event, the terminal control unit 13 executes the transition reproduction information recording process (Step SD14). In FIG. 13, reference numeral LG5 indicates the content of a fifth log that is newly recorded in the log data LD by the process in Step SD14. With the generation of the end event, the terminal control unit 13 further transitions the game state to the end node on the basis of the transition rule J3 defined in the terminal-side node definition data NDd (Step SD15). The terminal control unit 13 appropriately updates the terminal-side setting information with the transition to the end node. With the transition to the end node, the terminal control unit 13 executes the terminal-side setting information recording process (Step SD16). In FIG. 13, reference numeral LG6 indicates the content of a sixth log that is newly recorded in the log data LD by the process in Step SD16. The bonus game ends with the transition to the end node.

The game progress process has been described above. As described above, the terminal control unit 13 executes the following process in the game progress process. That is, while the user is playing the game, the terminal control unit 13 automatically transitions the node on the basis of the node definition data ND of the user terminal 3 and dynamically changes the value of the terminal-side setting information corresponding to the node definition data ND of the user terminal 3 with the transition of the node. In addition, the terminal control unit 13 automatically records the transition reproduction information that can reproduce the transition of the node and the value of the terminal-side setting information changed with the transition of the node as the log LG in the log data LD. More specifically, the terminal control unit 13 executes the following process. That is, while the user is playing the game, the terminal control unit 13 continuously monitors whether an event (trigger event) has been generated, automatically transitions the node on the basis of the transition rule of the node definition data ND of the user terminal 3 with the generation of the event (trigger event), and dynamically changes the value of the terminal-side setting information with the transition of the node. Further, the terminal control unit 13 automatically records the transition reproduction information indicating the content of the generated event as the log LG in the log data LD and automatically records the value of the terminal-side setting information changed with the transition of the node as the log LG in the log data LD.

As described above, in this embodiment, not the server control unit 10 but the terminal control unit 13 executes the transition of the node for progressing the unit game and the update of the terminal-side setting information associated by the transition of the node on the basis of the terminal-side node definition data NDd. That is, the terminal control unit 13 does not execute a process involving communication with the server 2, such as "a process of transmitting necessary information to the server 2 using communication and waiting for the reception of the result of the process from the server 2 by communication", for the transition of the node and the update of the terminal-side setting information. Therefore, for the progress of the unit game, the generation of communication between the user terminal 3 and the server 2 is suppressed, and a delay in the progress of the game caused by the generation of the communication is suppressed.

However, in the configuration in which the terminal control unit 13 progresses the unit game on the basis of the terminal-side node definition data NDd, the following problem may occur in a case where there are no measures. That is, while the unit game is being played, the terminal control unit 13 transitions the node, updates the terminal-side setting information, and progresses the unit game without requesting the server control unit 10 to make any determination. That is, while the unit game is being played, the correctness of the value of the terminal-side setting information is not verified by the server control unit 10. Therefore, there is a problem in that the game progresses in a state in which the value of the terminal-side setting information is incorrect even in a case where the value of the terminal-side setting information is modified from the original correct value due to fraudulent activities. For example, it is assumed that, in the lottery process in Step SD6 of the flowchart FD, the value of the point balance <item> is modified from 2000 pt (original correct value) to 100000 pt due to the function of the program illegally modified. Even in this case, when there are no measures, the correctness of the modified value of the point balance <item> is not verified by the server control unit 10. Therefore, in a case where there are no measures, the bonus game progresses with the value of the point balance <item> remaining at 100000 pt. As will be clear below, in this embodiment, countermeasures against the fraudulent activities are taken, and resistance to the fraudulent activities is improved.

As shown in FIG. 8, after starting the game progress process in Step SA4, the terminal control unit 13 monitors whether the unit game has been ended (Step SA6) while monitoring whether a log transmission condition related to the transmission of the log LG has been established (Step SA5). The processes in Step SA5 and Step SA6 are executed in parallel with the game progress process started in Step SA4. The log transmission condition is a condition for transmitting transmission log data DL (which will be described below). In this embodiment, it is set that the transmission log data DL is periodically transmitted at predetermined intervals (for example, 1 second, 10 seconds, or 30 seconds). Based on this, the log transmission condition according to this embodiment is a condition that the periodic transmission timing has come. Hereinafter, the timing when the transmission log data DL is transmitted is referred to as "log transmission timing".

In a case where it is determined in Step SA5 that the log transmission condition has been established (Step SA5: YES), the terminal control unit 13 executes the log transmission process (Step SA7) and advances the processing procedure to Step SA6. On the other hand, in a case where it is determined in Step SA5 that the log transmission condition has not been established (Step SA5: NO), the terminal control unit 13 advances the processing procedure to Step SA6. In a case where it is determined in Step SA6 that the unit game has been ended (Step SA6: YES), the terminal control unit 13 advances the processing procedure to Step SA8. In a case where it is determined that the unit game has not been ended (Step SA6: NO), the terminal control unit 13 returns the processing procedure to Step SA5. In Step SA8, the terminal control unit 13 transmits end notification information indicating the end of the unit game to the server control unit 10. The end notification information includes at least the running game ID of the corresponding unit game. After the process in Step SA8, the process of the flowchart FA ends.

Hereinafter, the log transmission process in Step SA7 will be described in detail. In the log transmission process, the terminal control unit 13 specifies logs LG that have not been transmitted to the server 2 among the logs LG recorded in the log data LD and generates the transmission log data DL including each of the specified logs LG. Each log LG is recorded in the transmission log data DL in time series. Then, the terminal control unit 13 transmits the transmission log data DL to the server control unit 10 together with the data ID corresponding to the unit game and the running game ID included in the registered node-related information received in Step SA2. Hereinafter, a combination of the data ID, the running game ID, and the transmission log data DL transmitted by the log transmission process is referred to as "log-related data".

For example, as shown in FIG. 13, in a case where first log transmission timing comes after the recording of the fourth log LG4 and before the recording of the fifth log LG5, the terminal control unit 13 transmits the transmission log data DL including the first to fourth logs LG1 to LG4. Then, in a case where second log transmission timing comes after the recording of the sixth log LG6, the terminal control unit 13 transmits the transmission log data DL including the fifth and sixth logs LG5 and LG6. Note that, in a case where there is no untransmitted log LG when the log transmission timing comes, the terminal control unit 13 does not transmit the transmission log data DL. However, in the following description, for convenience of explanation, it may be expressed that "the terminal control unit 13 periodically transmits the transmission log data DL".

As described above, in this embodiment, the terminal control unit 13 continuously monitors whether the log transmission condition is established while the user is playing the game. Then, in a case where the log transmission condition is established, the terminal control unit 13 automatically transmits the transmission log data DL including the log G recorded in the log data LD to the server 2.

As shown in the flowchart FB of FIG. 8, the server control unit 10 executes the following process after the process in Step SB4. That is, the server control unit 10 monitors whether the end notification information has been received (Step SB6) while monitoring whether the log-related data (transmission log data DL) has been received (Step SB5). In a case where it is determined in Step SB5 that the log-related data has been received (Step SB5: YES), the server control unit 10 executes a verification process (Step SB7) and advances the processing procedure to Step SB6. On the other hand, in a case where it is determined in Step SB5 that the transmission log data DL has not been received (Step SB5: NO), the server control unit 10 advances the processing procedure to Step SB6. In a case where it is determined in Step SB6 that the end notification information has not been received (Step SB6: NO), the server control unit 10 returns the processing procedure to Step SB5. In a case where it is determined that the end notification information has been received (Step SB6: YES), the server control unit 10 executes a server-side end process (Step SB8). In the server-side end process, a process that is determined as a process to be executed when the unit game ends is executed. For example, the server control unit 10 appropriately updates the user management database and other databases on the basis of the record corresponding to the running game ID included in the end notification information. After the process in Step SB8, the flowchart FB ends.

Note that the content of the flowchart FB of FIG. 8 is that one server 2 executes the processes in all steps. However, all processes do not need to be sequentially performed in one server 2. For example, it is assumed that the server 2 is configured by a plurality of server apparatuses and load is distributed by a load balancer. Further, it is assumed that the unit game is started by a certain specific user terminal 3 (user terminal TX). In this configuration, the server 2 that receives the start notification information from the user terminal TX, the server 2 that receives the transmission log data DL from the user terminal TX, and the server apparatus that receives the end notification information from the user terminal TX may be different from each other. Furthermore, in a case where the user terminal TX transmits the transmission log data DL a plurality of times, the server apparatuses that receive the plurality of transmission log data items DL may be different from each other.

As described above, while the unit game is being played by the user, the server control unit 10 continuously monitors whether the transmission log data DL has been received and executes the verification process with the reception of the transmission log data DL. Hereinafter, the verification process will be described in detail.

Figure 14:
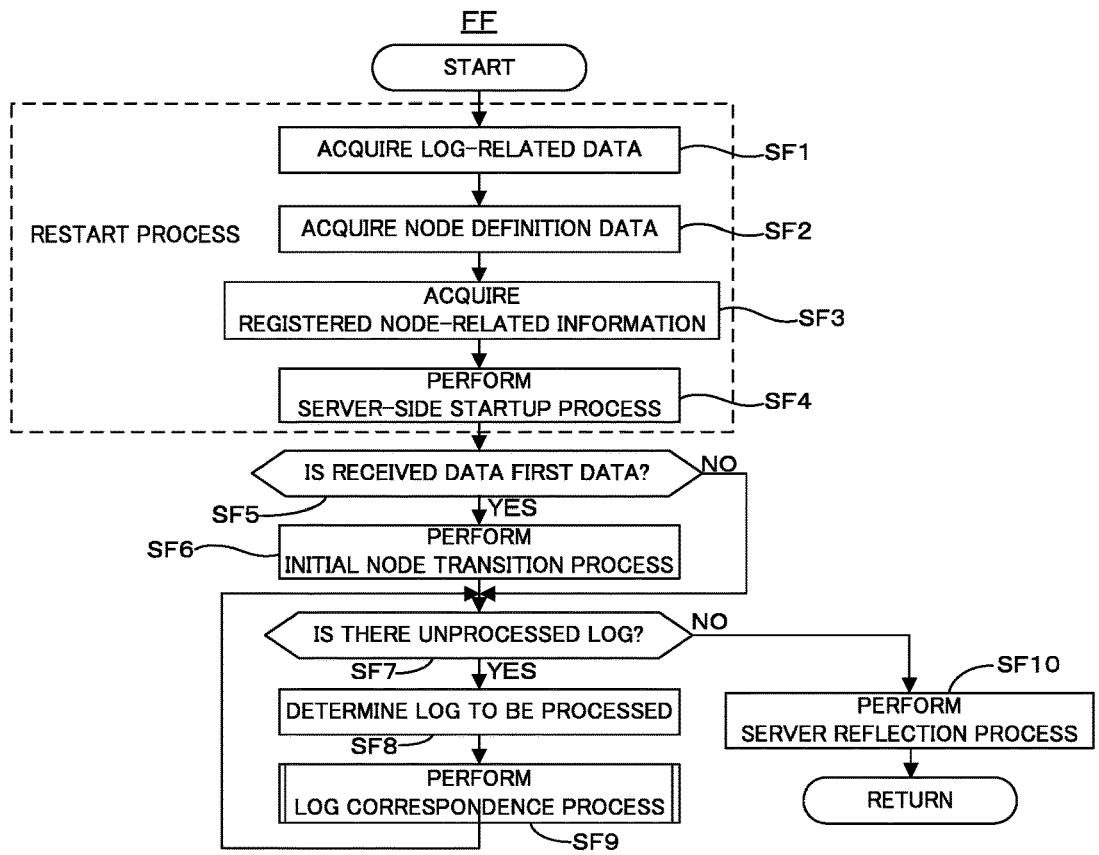
FIG. 14 is a diagram showing the control method executed by the server.

A flowchart FF of FIG. 14 shows details of the verification process. As shown in the flowchart FF, the server control unit 10 acquires the received log-related data (Step SF1). The log-related data includes the data ID and the running game ID corresponding to the unit game being played in the user terminal 3, which is a transmission source, and the transmission log data DL. Then, the server control unit 10 acquires the node definition data ND corresponding to the received data ID from the data management DB (Step SF2). Then, the server control unit 10 acquires the registered node-related information corresponding to the received running game ID from the game management DB (Step SF3).

Then, the server control unit 10 executes the server-side startup process (Step SF4). Specifically, the server control unit 10 generates an instance of the node definition data ND acquired in Step SF2 such that a process based on server-side node definition data NDs can be executed. With the generation of the instance of the node definition data ND, a value can be stored in each item of the server-side node-related information. Then, the server control unit 10 initializes the value of each item of the server-side node-related information with the value of each item of the registered node-related information acquired in Step SF3. As a result, the value of the server-side node-related information is matched with the value of the corresponding registered node-related information registered in the game management DB at the current time. Note that the server control unit 10 generates the instance of the node definition data ND, initializes each item of the node-related information, transitions the node on the basis of the server-side node definition data NDs, and progresses the unit game in a pseudo manner. Hereinafter, for convenience of explanation, the pseudo unit game progressed on the basis of the server-side node definition data NDs is referred to as a "pseudo unit game". In particular, the bonus game played in a pseudo manner is referred to as a "pseudo bonus game". Furthermore, the process in Steps SF1 to SF4 is referred to as a "restart process".

After the process in Step SF4, the server control unit 10 determines whether the received log-related data is data transmitted first after the start of the unit game (Step SF5). As described above, the terminal control unit 13 periodically transmits the log-related data (transmission log data DL) after the start of the unit game. Then, in Step SF5, the server control unit 10 determines whether the received log-related data is data transmitted at the first log transmission timing. Whether the received log-related data is the data transmitted first is managed, for example, by a predetermined flag. In addition, for example, the log-related data includes information indicating whether the received log-related data is the first data. In a case where the received log-related data is not the first data (Step SF5: NO), the server control unit 10 advances the processing procedure to Step SF7. In a case where the received log-related data is the first data (Step SF5: YES), the server control unit 10 executes the initial node transition process (Step: SF6). In the initial node transition process, the server control unit 10 transitions the game state to the initial node and executes the process in a case where the process at the time of transition is defined in the initial node. The value of the server-side setting information is appropriately updated with the transition to the initial node. After the process in Step SF6, the server control unit 10 advances the processing procedure to Step SF7.

After Step SF7, the server control unit 10 executes the log correspondence process on each of the logs LG included in the transmission log data DL in the time series of the logs LG. That is, in Step SF7, the server control unit 10 determines whether there is an unprocessed log LG among the logs LG recorded in the transmission log data DL. In a case where there is an unprocessed log LG (Step SF7: YES), the server control unit 10 determines the oldest log LG among the unprocessed logs LG as the log to be processed (Step SF8). Then, the server control unit 10 executes the log correspondence process on the log to be processed (Step SF9) and returns the processing procedure to Step SF7.

On the other hand, in a case where it is determined in Step SF7 that there is no unprocessed log LG (Step SF7: NO), the server control unit 10 executes a server reflection process (Step SF10). In the server reflection process in Step SF10, the server control unit 10 updates the value of each item of the registered setting information in the corresponding record (the record including the registered node-related information acquired in Step SF3) of the game management DB with the value of each item of the server-side setting information at the current time. After the process in Step SF10, the flowchart FF ends.

As described above, in this embodiment, in a case where the log correspondence process is completed on all of the logs LG recorded in the transmission log data DL without any state mismatch (which will be described below), the value of each item of the registered setting information in the corresponding record of the game management DB is updated with the value of each item of the server-side setting information. Therefore, when the restart process is performed the next time new log-related data is received, the value of each item of the server-side setting information becomes the value of each item at the time when the process has been completed on the previously received log-related data. As will be clear below, in a case where the state mismatch (which will be described below) occurs in the log correspondence process and error processing is performed, the verification process is interrupted. In this case, the server reflection process in Step SF10 is not performed.

Figure 15:
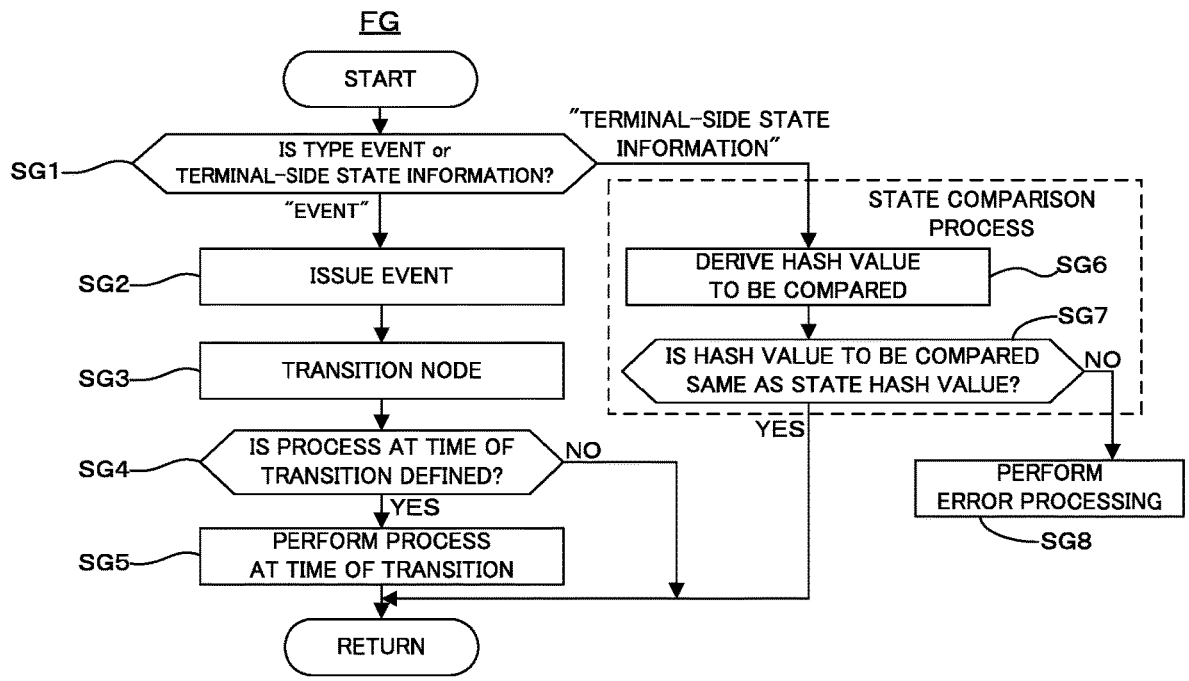
FIG. 15 is a diagram showing the control method executed by the server.

A flowchart FG of FIG. 15 shows details of the log correspondence process. In the log correspondence process, the server control unit 10 determines whether the type of the log to be processed is an event or the terminal-side setting information (Step SG1). As described above, in a case where the type of the log to be processed is an event, event content information is recorded in the log to be processed. In a case where the type is the terminal-side setting information, a state hash value is recorded in the log to be processed. In a case where the type of the log to be processed is an event (Step SG1: "event"), the server control unit 10 issues an event indicated by the event content information of the log to be processed (Step SG2). Note that, in a case where the event content information indicates an event having a parameter added thereto, the server control unit 10 accurately reproduces the parameter and issues the event. Then, the server control unit 10 transitions the node of the pseudo unit game according to the transition rules of the server-side node definition data NDs (Step SG3). The server control unit 10 updates necessary server-side setting information with the transition of the node. Then, the server control unit 10 determines whether the process at the time of transition is defined in the node after the transition (Step SG4). In a case where the process at the time of transition is defined (Step SG4: YES), the server control unit 10 executes the process at the time of transition (Step SG5). The process at the time of transition includes a process of changing the values of the state variables and other items of the server-side setting information. Therefore, in some cases, the values of one or more items of the server-side setting information are changed by the process in Step SG5. In addition, in a case where the process at the time of transition is a process using the random number, the server control unit 10 generates the random number using the random number seed stored in the random number seed <item> of the server-side setting information and the server-side random number generator. The value of the random number seed is matched with the value of the random number seed that has been generated by the server control unit 10 in Step SB2 and transmitted to the user terminal 3 in Step SB4.

As described above, each of the server 2 and the user terminal 3 can use the common random number generator. Therefore, the server control unit 10 generates the random number seed and transmits the random number seed to the user terminal 3. In a case where the process using the random number is executed with the transition of the node in the verification process, the server control unit 10 executes the process using the generated random number seed and the random number generator of the server 2. On the other hand, in a case where the process using the random number is executed with the transition of the node, the terminal control unit 13 executes the process using the random number seed received from the server 2 and the random number generator of the user terminal 3. Therefore, for a process performed using other random number generators, it is possible to completely match the result of the process of the server control unit 10 with the result of the process of the terminal control unit 13.

Note that, in the verification process, even in a case where the event to be issued at the time of completion is defined in the node after the transition, the server control unit 10 cancels the issuance of the event to be issued at the time of completion, without issuing the event to be issued at the time of completion. After the process in Step SG5, the log correspondence process ends. On the other hand, in a case where the process at the time of transition is not defined in the log after the transition (Step SG4: NO), the server control unit 10 ends the log correspondence process.

In a case where it is determined in Step SG1 that the type of the log to be processed is the terminal-side setting information (Step SG1: "terminal-side state information"), the server control unit 10 derives a hash value to be compared (Step SG6). The server control unit 10 derives the hash value to be compared using the same method as the terminal control unit 13 derives the state hash value. That is, the server control unit 10 acquires the value of each item of the server-side setting information. Then, the server control unit 10 generates array data on the basis of the value of each item according to the same rules as the user terminal 3. Then, the server control unit 10 derives a hash value using the same hash function as that of the user terminal 3. The hash value derived here is the hash value to be compared. When the value of each item of the terminal-side setting information that is the basis of the state hash value is the same as the value of each item of the server-side setting information that is the basis of the hash value to be compared, the state hash value is completely matched with the hash value to be compared.

Then, the server control unit 10 determines whether the hash value to be compared is the same as the state hash value included in the log to be processed (Step SG7). Here, in a case where these values are not the same, it means that the values of one or more items of the terminal-side setting information in the user terminal 3 have deviated from the correct values. Therefore, in this case, there is a high possibility that some fraudulent activities would be performed. Therefore, the determination of whether these values are the same is equivalent to that the server 2 determines whether the fraudulent activities have been performed in the user terminal 3. In a case where the hash value to be compared is the same as the state hash value (Step SG7: YES), the server control unit 10 ends the log correspondence process. On the other hand, in a case where these values are not the same (Step SG7: NO), the server control unit 10 executes error processing (Step SG8). The error processing will be described below. In a case where the error processing is executed, the verification process is interrupted.

In the following description, in some cases, the fact that the hash value to be compared is not the same as the state hash value in the log correspondence process is expressed as a "state mismatch". Further, the process of deriving the hash value to be compared and comparing the hash value to be compared with the state hash value in Steps SG6 and SG7 is referred to as a "state comparison process".

Then, the verification process executed by the server control unit 10 in this example will be described. A flowchart FE of FIG. 12 shows details of the verification process executed by the server control unit 10 in this example. In this example, it is assumed that the terminal control unit 13 transmits the transmission log data DL (hereinafter, referred to as "first transmission log data DL-1") including the first to fourth logs LG1 to LG4 at the first log transmission timing and transmits the transmission log data DL (hereinafter, referred to as "second transmission log data DL-2") including the fifth and sixth logs LG5 and LG6 at the second log transmission timing. The first to sixth logs LG1 to LG6 are shown in FIG. 13. The flowchart FE of FIG. 12 shows a verification process corresponding to the reception of the first transmission log data DL-1 and a verification process corresponding to the reception of the second transmission log data DL-2.

As shown in the flowchart FE, when log-related data including the first transmission log data DL-1 is received (Step SE1), the server control unit 10 executes the restart process (Step SE2). As a result, the process based on the server-side node definition data NDs can be executed, and the value of each item of the server-side node-related information is initialized by the value of each item of the registered node-related information at the current time in the corresponding record of the game management DB. Then, the server control unit 10 performs the initial node transition process to transition the game state of the pseudo bonus game to the standby node (Step SE3). With the transition to the standby node, the server control unit 10 appropriately updates the value of the server-side setting information.

Then, the server control unit 10 performs the log correspondence process based on the first log LG1 and issues a card selection event (Step SE4). The card selection event issued here corresponds to the card selection event recorded in the log data LD by the transition reproduction information recording process in the flowchart FD. With the generation of the card selection event, the server control unit 10 transitions the game state of the pseudo bonus game to the lottery node on the basis of the transition rule J1 of the server-side node definition data NDs (Step SE5). With the transition to the lottery node, the server control unit 10 updates the value of the server-side setting information. With the generation of the card selection event, the server control unit 10 further executes the lottery process defined as the process at the time of transition to the lottery node (Step SE6).

For the lottery process in Step SE6, the server control unit 10 executes the following process. That is, the server control unit 10 inputs the random number seed stored in the random number seed <item> of the server-side node-related information to the server-side random number generator and obtains the output value of the server-side random number generator. Then, the server control unit 10 determines the result of card selection on the basis of the output value according to the same lottery rule as that used by the terminal control unit 13. Then, the server control unit 10 updates the value of each item of the server-side state variables on the basis of the determined result. Here, the random number generator used by the terminal control unit 13 in the lottery process in Step SD6 of the flowchart FD and the random number generator used by the server control unit 10 in the lottery process in Step SE6 of the flowchart FE are common. Furthermore, the value of the random number seed that is input to the random number generator by the terminal control unit 13 in the lottery process is the same as the value of the random number seed that is input to the random number generator by the server control unit 10 in the lottery process. Therefore, the result of the lottery process by the server control unit 10 is certainly the same as the result of the lottery process by the terminal control unit 13. As a result, in a case where no fraudulent activities have been performed in the user terminal 3, the value of the server-side state variable at the time when the lottery process in Step SE6 ends is matched with the value of the terminal-side state variable at the time when the lottery process in Step SD6 of the flowchart FD ends.

After the process in Step SE6, the server control unit 10 executes the status comparison process of the log correspondence process based on the second log LG2 (Step SE7). In the state comparison process in Step SE7, it is determined whether the hash value to be compared which is based on the value of each item of the server-side setting information at the current time is the same as the state hash value recorded in the log data LD in Step SD7 of the flowchart FD. These values are matched with each other in a case where no fraudulent activities have been performed in the user terminal 3. In a case where it is determined in Step SE7 that the values are not the same, the server control unit 10 interrupts the verification process and executes the error processing.

After the process in Step SE7, the server control unit 10 performs the log correspondence process based on the third log LG3 and issues a lottery completion event (Step SE8). This lottery completion event corresponds to the lottery completion event recorded in the transition reproduction information recording process in Step SD9 of the flowchart FD. With the generation of the lottery completion event, the server control unit 10 transitions the game state of the pseudo bonus game to the standby node on the basis of the transition rule J2 of the server-side node definition data NDs (Step SE9). With the transition of the standby node, the server control unit 10 updates the value of each item of the server-side setting information.

After the process in Step SE9, the server control unit 10 executes the status comparison process based on the fourth log LG4 (Step SE10). In the state comparison process, it is determined whether the hash value to be compared which is based on the value of each item of the server-side setting information at the current time is the same as the state hash value recorded in the log data LD in Step SD11 of the flowchart FD. In a case where it is determined in Step SE10 that the values are not the same, the server control unit 10 interrupts the verification process and executes the error processing. After the process in Step SE10, the server control unit 10 executes the server reflection process (Step SE11). The value of each item of the registered node-related information in the corresponding record of the game management DB becomes the value of each item of the server-side node-related information at the current time by the process in Step SE11. In this way, the verification process based on the first transmission log data DL-1 is completed.

Then, the server control unit 10 receives the log-related data including the second transmission log data DL-2 (Step SE12). Then, the server control unit 10 executes the restart process (Step SE13). The process based on the server-side node definition data NDs can be executed by the process in Step SE13. Further, the value of each item of the server-side node-related information is initialized by the value of each item of the registered node-related information at the current time in the corresponding record of the game management DB. Then, the server control unit 10 performs the log correspondence processing based on the fifth log LG5 and issues an end event (Step SE14). This end event corresponds to the end event recorded in the log data LD in Step SD14 of the flowchart FD. With the generation of the end event, the server control unit 10 transitions the game state of the pseudo bonus game to the end node on the basis of the transition rule J3 of the server-side node definition data NDs (Step SE15). With the transition to the end node, the server control unit 10 updates the value of the server-side setting information. After the process in Step SE15, the server control unit 10 executes the state comparison process based on the fifth log LG5 (Step SE16). After the process in Step SE16, the server control unit 10 executes the server reflection process (Step SE17). The value of each item of the registered node-related information in the corresponding record of the game management DB becomes the value of each item of the server-side node-related information at the current time by the process in Step SE17. In this way, the verification process based on the second transmission log data DL-2 is completed.

As described above, the server control unit 10 reproduces the transition of the node on the basis of the transition reproduction information of the transmission log data DL received from the user terminal 3 and the node definition data ND of the server 2. In addition, the server control unit 10 executes the verification process that changes the value of the server-side setting information corresponding to the node definition data ND of the server 2 with the transition of the node and compares the value of the server-side setting information with the value of the corresponding terminal-side setting information recorded in the transmission log data DL. More specifically, in the verification process, the server control unit 10 generates a trigger event in time series on the basis of the transition reproduction information recorded in the transmission log data DL, automatically transitions the node on the basis of the node definition data of the server with the generation of the trigger event, dynamically changes the value of the server-side setting information with the transition of the node, and compares the changed value of the server-side setting information with the value of the corresponding terminal-side setting information recorded in the transmission log data. The following effects are obtained by this configuration. That is, in a case where the value of the server-side setting information is not the same as the value of the corresponding terminal-side setting information recorded in the transmission log data DL, the value of the terminal-side setting information in the user terminal 3 has deviated from the correct value. Therefore, in this case, there is a high possibility that some fraudulent activities would be performed in the user terminal 3. Therefore, the comparison between these values is equivalent to that the server 2 determines whether fraudulent activities have been performed in the user terminal 3. Thus, according to the above configuration, it is possible to detect fraudulent activities and to perform a process of preventing/deterring fraudulent activities according to the detection of the fraudulent activities or a process of suppressing adverse effects caused by the fraudulent activities. As a result, it is possible to improve resistance to the fraudulent activities.

Next, the error processing will be described in detail. In the error processing, a process that contributes to the prevention/determent of the fraudulent activities or a process that suppresses the adverse effects caused by the fraudulent activities is executed. In this embodiment, the server control unit 10 executes a rollback process as the error processing. In the rollback process, the server control unit 10 establishes a state in which the game is resumed from a stage before the stage in which the state hash value (the value of the terminal-side setting information) determined to be the same as the hash value to be compared (the value of the server-side setting information) was recorded in the log data LD in the past. Hereinafter, an example of the error processing using this example will be described.

It is assumed that, for example, the state mismatch occurs in the state comparison process in Step SE16 with reference to the flowchart FE of FIG. 12. In this case, this means that the state mismatch has not occurred in the state comparison process in Step SE10. In this case, it is assumed that the values of one or more items of the terminal-side setting information have been modified by fraudulent activities during a period from the timing when the process in Step SD11 of the flowchart FD was performed to the timing when the process in Step SD16 was performed. Note that, in this case, the server control unit 10 interrupts the verification process and does not execute the server reflection process in Step SE17.

Therefore, when the state mismatch occurs in Step SE16, the server control unit 10 acquires the registered node-related information at the current time with reference to the corresponding record of the game management DB. The registered node-related information acquired here is information updated in the server reflection process in Step SE11. Then, the server control unit 10 transmits the acquired registered node-related information and the node definition data ND corresponding to the bonus game to the terminal control unit 13. Further, the server control unit 10 instructs the terminal control unit 13 to resume the bonus game from the stage in which the terminal-side setting information recording process in Step SD11 was performed.

In response to the instruction, the terminal control unit 13 generates an instance on the basis of the received node definition data ND and initializes the value of each item of the terminal-side node-related information corresponding to the instance on the basis of the received registered node-related information. The value of the current node <item> is updated by this initialization, and the game state of the bonus game is transitioned to the node (the standby node in this example) indicated by the current node <item> of the terminal-side setting information. Further, the terminal control unit 13 executes a process corresponding to the value of each item of the terminal-side setting information. In this example, the terminal control unit 13 displays the post-selection screen G2 on the terminal display unit 15. As a result of the above process, a state is established in which the bonus game is resumed from the stage in which the terminal-side setting information recording process in Step SD11 was performed.

Note that, after the bonus game is resumed, the terminal control unit 13 executes the game progress process according to the processes after Step SC4 in the flowchart FC of FIG. 11 and periodically transmits the log-related data. The server control unit 10 executes the verification process with the reception of the log-related data.

As described above, in this embodiment, in a case where the state mismatch occurs in the log correspondence process, the bonus game is resumed from the time point when there is no influence from the fraudulent activities. This configuration makes it possible to suppress the adverse effects of the fraudulent activities even in a case where the fraudulent activities have been performed. In addition, it is possible to make the user who has performed fraudulent activities aware that the user is not able to enjoy the benefits of the fraudulent activities even when the user performs the fraudulent activities and to restrain the user from performing any fraudulent activities. Note that, for the user who does not perform fraudulent activities, while the bonus game is being played, the rollback process is not performed, and the game progresses smoothly. Therefore, the degree of satisfaction of the user who does not perform fraudulent activities would not decrease.

Modification Example

Figure 16:
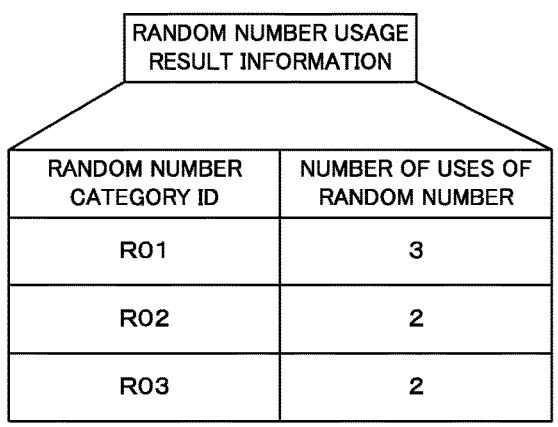
FIG. 16 is a diagram showing content of random number usage result information.

Next, a modification example of the above-described embodiment will be described. In this modification example, the management information includes random number usage result information as an item. FIG. 16 is a diagram schematically showing content of the random number usage result information. In the random number usage result information, a random number category ID <item> and the number of uses of the random number <item> are provided for each random number category that can be used in the unit game. The random number category will be described below. A random number category ID which is identification information of the random number category is stored in the random number category ID <item>. The number of uses of the random number indicating the number of times the random number has been used in the corresponding random number category is stored in the number of uses of the random number <item>. The initial value of the number of uses of the random number is a value indicating 0. A first record in FIG. 16 shows that the random number was used three times in the random number category with a random number category ID: R01. Note that the terminal-side setting information includes the number of times the terminal control unit 13 uses the random number for each category in the unit game. Further, the server-side setting information includes the number of times the server control unit 10 uses the random number for each category in the verification process.

Figure 17:
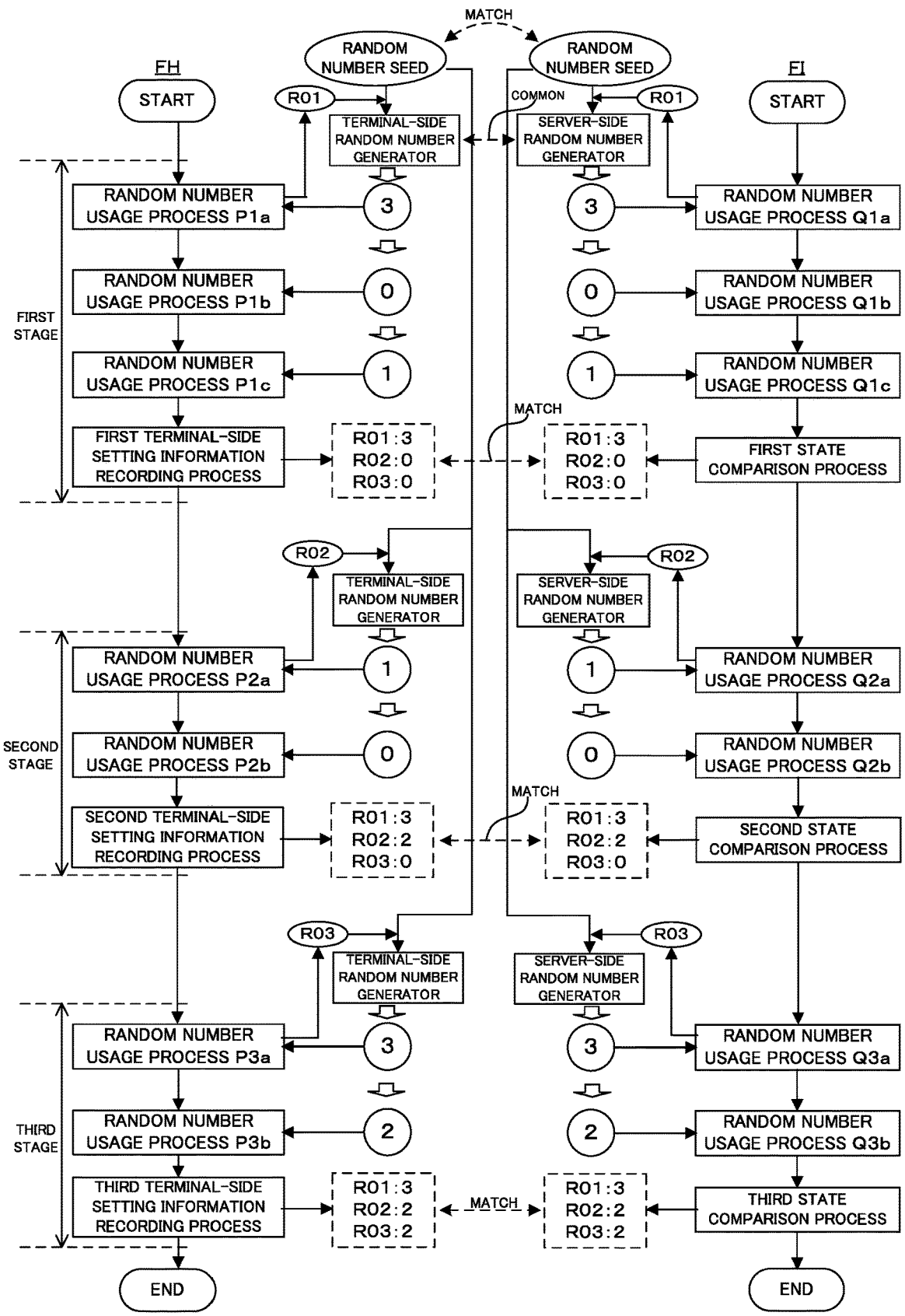
FIG. 17 is a diagram showing a control method executed by the terminal and a control method executed by the server.

In this modification example, the terminal control unit 13 executes the following process in the game progress process. A flowchart FH of FIG. 17 shows a portion related to a random number usage process in the game progress process executed by the terminal control unit 13. In the following description, it is assumed that the unit game is provided with a first stage, a second stage, and a third stage. In addition, it is assumed that, as the random number category ID, "R01" is assigned to the first stage, "R02" is assigned to the second stage, and "R03" is assigned to the third stage. Further, as described above, the process at the time of transition includes the process using the random number. Hereinafter, the process using the random number is referred to as a "random number usage process". In the first stage, random number usage processes P1a to P1c are executed. In the second stage, random number usage processes P2a and P2b are executed. In the third stage, random number usage processes P3a and P3b are executed. Note that, in the description using FIG. 17, it is assumed that the random number generator outputs an integer in the range of 0 to 3. Furthermore, the random number usage process is executed with the transition of the node, which is not particularly described.

As shown in the flowchart FH of FIG. 17, when executing the random number usage process P1a in the first stage, the terminal control unit 13 designates the random number category ID: R01 (category) corresponding to the first stage. The designation is executed, for example, by passing the random number category ID: R01 as a parameter to a function that generates the random number. Then, the terminal control unit 13 changes the value of the random number seed according to the designated random number category ID (category). As described in the embodiment, the random number seed is received from the server 2. A rule for changing the value of the random number seed is that, in a case where the random number seed is the same, when the category ID is different, the changed value of the random number seed is different and that, when the category ID is the same, the changed value of the random number seed is the same. The rule is, for example, a rule that adds a value corresponding to the category ID to the value of the random number seed. Hereinafter, the random number seed after the change is referred to as a "changed random number seed".

Then, the terminal control unit 13 inputs the changed random number seed to the terminal-side random number generator and obtains the output of the terminal-side random number generator. FIG. 17 shows that the output of the terminal-side random number generator in the random number usage process P1a is 3. Further, the terminal control unit 13 increments the value of the number of uses of the random number corresponding to the random number category ID: R01 of the random number usage result information in the terminal-side setting information. Thereafter, in the first stage, in a case where the random number usage process is executed, the terminal control unit 13 sequentially uses (consumes) the output values that are consecutively output by the terminal-side random number generator that receives, as an input, the changed random number seed changed corresponding to the category ID: R01. Furthermore, the terminal control unit 13 increments the value of the corresponding number of uses of the random number with the use of the random number. As described above, the random number generator is a recurrence formula. When a specific value is input, an aspect of the consecutive output values is a specific aspect. FIG. 17 shows an aspect in which, in the first stage, a random number: 0 is used in the random number usage process P1*b* and a random number: 1 is used in the random number usage process P1*c*.

After the random number usage process P1*c*, the terminal control unit 13 executes a first terminal-side setting information recording process. At this time, the numbers of uses of the random number corresponding to random number category IDs: R01, R02, and R03 are 3, 0, and 0, respectively.

In the second stage following the first stage, the terminal control unit 13 executes the following process. That is, in the random number usage process P2*a*, the terminal control unit 13 designates the random number category ID: R02 and generates the changed random number seed according to the designated random number category ID. The terminal control unit 13 inputs the changed random number seed to the terminal-side random number generator and obtains an output value (random number). In the random number usage process P2*b* following the random number usage process P2*a*, the terminal control unit 13 acquires the next output value (random number) output by the terminal-side random number generator that receives, as an input, the changed random number seed corresponding to the random number category ID: R02. The terminal control unit 13 increments the value of the corresponding number of uses of the random number with the use of the random number. FIG. 17 shows an aspect in which, in the second stage, the random number: 1 is used in the random number usage process P2*a* and the random number: 0 is used in the random number usage process P2*b*. After the random number usage process P2*b*, the terminal control unit 13 executes a second terminal-side setting information recording process. At this time, the numbers of uses of the random number corresponding to the random number category IDs: R01, R02, and R03 are 3, 2, and 0, respectively.

In the third stage following the second stage, the terminal control unit 13 executes the same process as that in the first stage and the second stage. FIG. 17 shows an aspect in which, in the third stage, a random number: 3 is used in the random number usage process P3*a* and a random number: 2 is used in the random number usage process P3*b*. After the random number usage process P3*b*, the terminal control unit 13 executes a third terminal-side setting information recording process. At this time, the numbers of uses of the random number corresponding to the random number category IDs: R01, R02, and R03 are 3, 2, and 2, respectively.

As described above, in this embodiment, when executing the process using the random number with the transition of the node, the terminal control unit 13 designates a category, changes the value of the random number seed according to the designated category, and executes the process using the random number seed whose value has been changed and the random number generator stored in the terminal. The following effect is obtained by this process. That is, in the unit game, in a case where the output values (random numbers) that are consecutively output by the terminal-side random number generator on the basis of one random number seed are continuously used, the predictability of the random numbers increases, and so-called random number adjustment is easy to perform. Meanwhile, a plurality of categories are provided in the unit game, and an independent random number seed is used for each category, which makes is possible to eliminate the relation between the random numbers for each category in the unit game, to reduce the predictability of the random numbers, and to improve difficulty in the random number adjustment.

Next, the operation of the server 2 in this modification example will be described. A flowchart FI of FIG. 17 shows an example of the operation of the server 2 in a case where the user terminal 3 executes the process in the flowchart FH. In particular, the flowchart FI shows an example of the operation of the server 2 in the verification process. As shown in the flowchart FI, the server control unit 10 executes random number usage processes Q1*a*, Q1*b*, and Q1*c* with the transition of the node in the verification process. The random number usage processes Q1*a*, Q1*b*, and Q1*c* correspond to the random number usage processes P1*a*, P1*b*, and P1*c* executed by the terminal control unit 13 in the flowchart FH, respectively. In the random number usage process Q1*a*, the server control unit 10 designates the random number category ID: R01 and generates the changed random number seed on the basis of the random number category ID: R01 according to the same rule as that of the user terminal 3. Then, the server control unit 10 inputs the changed random number seed to the server-side random number generator and obtains the output value (random number) of the server-side random number generator. Since the server-side random number generator and the terminal-side random number generator are common, the value of the random number used in the random number usage process Q1*a* related to the server 2 is certainly matched with the value of the random number used in the random number usage process P1*a* related to the user terminal 3. Thereafter, the server control unit 10 sequentially uses (consumes) the output values that are consecutively output by the server-side random number generator on the basis of the changed random number seed corresponding to the category ID: R01 in the random number usage processes Q1*b* and Q1*c*. As a result, the value of the random number used in the random number usage processes Q1*b* and Q1*c* related to the server 2 is the same as the value of the random number used in the random number usage processes P1*b* and P1*c* related to the user terminal 3.

Further, the server control unit 10 executes a first state comparison process after the random number usage process Q1*c*. In this first state comparison process, the value of the number of uses of the random number in the random number usage result information, which is the basis of the hash value to be compared, is as follows: the random number category ID: R01→3; the random number category ID: R02→0; and the random number category ID: R03→0. This is matched with the value of the number of uses of the random number in the random number usage result information which is the basis of the state hash value in the first terminal-side setting information recording process. Therefore, in a case where no fraudulent activities have been performed, the state mismatch does not occur in the first state comparison process.

Random number usage processes Q2*a* and Q2*b* in the flowchart FI correspond to the random number usage processes P2*a* and P2*b* executed by the terminal control unit 13 in the flowchart FH, respectively. For the random number usage processes Q2*a* and Q2*b*, the server control unit 10 sequentially uses (consumes) the output values that are consecutively output by the server-side random number generator on the basis of the changed random number seed corresponding to the category ID: R02. After the random number usage process Q2*b*, the server control unit 10 executes a second state comparison process. In this second state comparison process, in a case where no fraudulent activities have been performed, the state mismatch does not occur for the same reason as that in the first state comparison process. Further, random number usage processes Q3*a* and Q3*b* in the flowchart FI correspond to the random number usage processes P3*a* and P3*b* executed by the terminal control unit 13 in the flowchart FH, respectively. For the random number usage processes Q3*a* and Q3*b*, the server control unit 10 sequentially uses (consumes) the output values that are consecutively output by the server-side random number generator on the basis of the changed random number seed corresponding to the category ID: R03. As a result, the value of the random number used in the random number usage processes Q3*a* and Q3*b* related to the server 2 is the same as the value of the random number used in the random number usage processes P3*a* and P3*b* related to the user terminal 3. Furthermore, in a third state comparison process following the random number usage process Q3*b*, in a case where no fraudulent activities have been performed, the state mismatch does not occur for the same reason as that in the first state comparison process.

As described above, in the verification process, in a case where the process using the random number is executed with the transition of the node, the server control unit 10 designates the same category as the category designated by the terminal control unit 13 in the corresponding process performed in the user terminal 3, changes the value of the random number seed according to the designated category, and executes the process using the random number seed whose value has been changed and the random number generator of the server 2.

One embodiment of the invention has been described above. However, the above-described embodiment is only an example of the implementation of the invention and should not be construed as limiting the technical scope of the invention. That is, the invention can be implemented in various ways without departing from the gist or main features of the invention.

For example, in the above-described embodiment, the log transmission condition is that a periodic timing has come. However, the content of the log transmission condition is not limited to the content given as an example in the above-described embodiment. For example, the log transmission condition may be that a predetermined number of logs LG have been recorded in the log data LD. In this case, the predetermined number of logs LG may be one or two or more.

In addition, in the above-described embodiment, the terminal control unit 13 is configured to transmit the transmission log data DL including an untransmitted log among the logs recorded in the log data LD in a case where the log transmission condition is established. In this regard, the terminal control unit 13 may be configured to transmit the transmission log data DL including all of the logs LG recorded in the log data LD. In the case of this configuration, each time the server control unit 10 receives the transmission log data DL, the server control unit 10 may extract an unprocessed log LG and execute the log correspondence process. Further, the server control unit 10 may execute the log correspondence process on all of the logs LG each time the server control unit 10 receives the transmission log data DL.

Furthermore, in the above-described embodiment, the terminal control unit 13 records the state hash value, which is a hash value, in the log data LD. In this regard, the terminal control unit 13 may be configured to record not the state hash value but the value (unhashed value) of the terminal-side setting information in the log data LD according to a format. In this case, the log LG of the transmission log data DL includes the value (unhashed value) of the terminal-side setting information instead of the state hash value. In the case of this configuration, in the state comparison process, the server control unit 10 does not derive the hash value to be compared and determines whether the value of the server-side setting information of the server-side node definition data NDs is the same as the value of the corresponding terminal-side setting information of the transmission log data DL.

Furthermore, the error processing executed by the server control unit 10 is not limited to the process given as an example in the above-described embodiment. For example, the server control unit 10 may be configured to execute the following process. For example, the server control unit 10 may be configured to establish a state in which the unit game is resumed from the beginning as the error processing. In this case, the server control unit 10 discards the record of the game management DB which corresponds to the unit game to be resumed and re-executes the processes from Step SB1 in the flowchart FB of FIG. 8. In addition, for example, the server control unit 10 may be configured to notify the user of a predetermined warning in cooperation with the terminal control unit 13. Further, for example, the server control unit 10 may be configured to register the users who have performed fraudulent activities in a list. That is, the process executed by the server control unit 10 when the state mismatch occurs may be any process that contributes to the prevention/determent of fraudulent activities or any process that suppresses the adverse effects caused by the fraudulent activities.

Furthermore, in the above-described embodiment, the server control unit 10 is configured to transmit the random number seed to the terminal control unit 13 together with the node definition data ND. However, when no random numbers are used in the unit game, the terminal control unit 13 may be configured not to transmit the random number seed.

Moreover, the content of the log LG is not limited to the content given as an example in the above-described embodiment. In particular, in the above-described embodiment, the transition reproduction information is information indicating the content of the event (trigger event). However, the content of the transition reproduction information is not limited to the content given as an example. For example, the transition reproduction information may be information that identifies the transition rule referred to when the node is transitioned. In addition, for example, in a case where the node can be configured to be transitioned by a phenomenon other than the event, the transition reproduction information may be information indicating a phenomenon that has triggered the transition of the node. That is, the transition reproduction information may be any information that can be used by the server control unit 10 to reproduce the transition of the node in the verification process.

Further, in the above-described embodiment, the transition rule is recorded in the node definition data. However, the transition rule may be configured not to be recorded in the node definition data. For example, the transition rule may be recorded in a file that is different from the node definition data ND. However, in the case of this configuration, a combination of the file of the node definition data ND and the file in which the transition rule has been recorded may be considered to be the "node definition data". In addition, for a certain unit game, the transition rule may be defined in a program (a program that is different from the program related to the node definition data) used by the server control unit 10, and a transition rule having the same content as the transition rule related to the server 2 may be defined in the program (for example, the game application AP) used by the terminal control unit 13. That is, a state may be established in which the server control unit 10 and the terminal control unit 13 use the transition rules having the same content for the unit game.

Furthermore, in this embodiment, before the unit game is provided, a state (hereinafter, referred to as a "shared state") is established in which each of the server 2 and the user terminal 3 can use the common node definition data ND corresponding to the unit game. Therefore, a method for establishing the shared state is not limited to the method given as an example in this embodiment. For example, for one unit game, the node definition data ND may be uploaded to the server 2, and the node definition data ND may be incorporated into the game application AP. In the case of this configuration, the content of the node definition data ND in the user terminal 3 may be modified (updated) by updating the game application AP. Further, in this configuration, the node definition data ND may not be incorporated into the game application AP from the beginning, but may be incorporated as additional data later. Furthermore, for example, the shared state may be established by downloading the node definition data ND stored in a CD-ROM, a USB memory, or other physical media to the user terminal 3. That is, any means may be used to establish the shared state, and a state in which each of the server 2 and the user terminal 3 can use the common node definition data ND corresponding to the unit game may be established before the unit game is provided. Note that "the node definition data ND used by the server 2 and the node definition data ND used by the user terminal 3 are common" does not mean that the node definition data ND related to the server 2 and the node definition data ND related to the user terminal 3 are completely matched with each other including formal points. That is, that these data items are common means that, when a process is executed on the basis of the node definition data ND, these data items have the same content in that the node is transitioned in the same aspect, the process is performed in the same aspect, and the setting information is updated in the same aspect unless fraudulent activities are performed.

In addition, in the above-described embodiment, the game provided by the user terminal 3 and the server 2 is provided by a dedicated application downloaded to the user terminal 3. However, the game is not limited to the game given as an example in the above-described embodiment. For example, the game may be an online game that is played using a browser.

Further, as described above, the node definition data ND may not be a program file, but may be data in which information is described in JSON or other description formats. That is, the node definition data ND may be data in which the node is described in an aspect that can be used by the terminal control unit 13 and the server control unit 10. For example, it is assumed that the node definition data ND is text data in which information is described in a predetermined data format. In addition, it is assumed that, for each item (or some items) of the setting information of the node definition data ND, an item name and an item value are described in text data constituting the node definition data ND by text in association with each other. In this configuration, the terminal control unit 13 appropriately refers to the text data constituting the node definition data ND and executes the transition of the node and a process associated with the transition of the node (the same applies to the server control unit 10). In addition, the terminal control unit 13 appropriately updates the item value recorded in the text data to update the value of the setting information.

Further, in the above-described embodiment, a specific example of the terminal-side setting information is given. Here, it is assumed that the terminal-side setting information means information to be compared with the server-side setting information in the state comparison process. In the above-described embodiment, a combination of the items which are the basis of the state hash value corresponds to the terminal-side setting information. Therefore, for the terminal-side setting information, the aspect of the terminal-side setting information is not limited to the aspect given as an example in the above-described embodiment. For example, a configuration may be adopted in which some state variables among the terminal-side state variables or some items of the terminal-side management information are included in the terminal-side setting information. In addition, a configuration may be adopted in which either the setting information or the management information is included in the terminal-side setting information. That is, the terminal-side setting information may be any information whose value can be changed with the transition of the node as the unit game progresses. Note that the items of the server-side setting information to be compared in the state comparison process are appropriately selected according to the items of the terminal-side setting information.

Further, the content of the node-related information is not limited to the content given as an example in the above-described embodiment. For example, the node-related information may include the user ID or the version of the node definition data ND.

Furthermore, in the above-described embodiment, a configuration may be adopted in which a browser executes some or all of the processes executed by the function of the game application AP.

Moreover, in the above-described embodiment, a configuration may be adopted in which the data management DB and the game management DB are stored in the server storage unit 12.

In addition, the functional blocks shown in the above-described embodiment can be implemented by any hardware or cooperation between any hardware and any software. That is, these functional blocks are not limited to specific hardware.

Further, the unit of the process in the flowcharts of the above-described embodiment is divided according to the content of the main process for ease of understanding of the process. The invention is not limited by a method for dividing the unit of the process or the name thereof. The process of each device can also be divided into a larger number of units of processes according to the content of the process. Further, one unit of process can be divided so as to include a larger number of processes. Furthermore, the order of the processes in the above-described flowcharts is not limited to the examples shown in the flowcharts as long as the same processes can be performed.

In addition, for example, the embodiment can include the provision of the program executed by the computer of the server 2 or the user terminal 3. Further, the embodiment can include the provision of a recording medium on which the program is recorded in a computer-readable manner. Examples of the recording medium include a flexible disk, a hard disk drive (HDD), a compact disc read only memory (CD-ROM), a digital versatile disc (DVD), a Blu-ray disc (registered trademark), a magneto-optical disk, a flash memory, and a card-type recording medium.

REFERENCE SIGNS LIST

1: control system
2: server
3: user terminal (terminal)
10: server control unit
13: terminal control unit LD: log data
LG: log
ND: node definition data
DL: transmission log data

The invention claimed is:

1. A control system for providing a game, the control system comprising:
a server; and
a terminal capable of communicating with the server,
wherein, before the game is provided, a state is established in which each of the server and the terminal is capable of using common node definition data corresponding to the game,
a plurality of nodes indicating a state of the game are defined in the node definition data,
the terminal includes a terminal control unit having:
a function of transitioning the node on the basis of the node definition data of the terminal, changing a value of terminal-side setting information corresponding to the node definition data of the terminal with the transition of the node, and recording transition reproduction information capable of reproducing the transition of the node and the value of the terminal-side setting information changed with the transition of the node as a log in log data while the game is being played by a user; and
a function of transmitting transmission log data including the log recorded in the log data to the server in a case where a log transmission condition related to the transmission of the log is established, and
the server includes a server control unit having a function of executing a verification process that reproduces the transition of the node on the basis of the transition reproduction information of the transmission log data received from the terminal and the node definition data of the server, changes a value of server-side setting information corresponding to the node definition data of the server with the transition of the node, and compares the value of the server-side setting information with the value of the corresponding terminal-side setting information recorded in the transmission log data.

2. The control system according to claim 1,
wherein a transition rule, in which a trigger event triggering the transition of the node and an aspect of the transition of the node when the trigger event is generated are defined, is further defined in the node definition data,
the terminal control unit transitions the node on the basis of the transition rule of the node definition data of the terminal with the generation of the trigger event and changes the value of the terminal-side setting information with the transition of the node while the game is being played by the user,
the terminal control unit records the transition reproduction information indicating content of the generated trigger event as the log in the log data and records the value of the terminal-side setting information changed with the transition of the node as the log in the log data, and
in the verification process, the server control unit generates the trigger event in time series on the basis of the transition reproduction information recorded in the transmission log data, transitions the node on the basis of the node definition data of the server with the generation of the trigger event, changes the value of the server-side setting information with the transition of the node, and compares the changed value of the server-side setting information with the value of the corresponding terminal-side setting information recorded in the transmission log data.

3. The control system according to claim 1,
wherein a state variable indicating a state of a predetermined item related to the game and a process at the time of transition, which is a process to be executed in a case of a transition to this node, are capable of being defined in the node definition data,
the process at the time of transition includes a process of changing the state variable,
the terminal-side setting information includes the state variable defined in the node definition data of the terminal, and
the server-side setting information includes the state variable defined in the node definition data of the server.

4. The control system according to claim 1,
wherein the terminal control unit records a state hash value, which is a hash value of the value of the terminal-side setting information, as the value of the terminal-side setting information in the log data, and
in the verification process, the server control unit derives a hash value to be compared, which is a hash value of the value of the server-side setting information, with the transition of the node and compares the hash value to be compared with the corresponding state hash value recorded in the transmission log data.

5. The control system according to claim 1,
wherein each of the server and the terminal is capable of using a common random number generator,
the server control unit generates a random number seed and transmits the random number seed to the terminal,
in the verification process, in a case where a process using a random number is executed with the transition of the node, the server control unit executes the process using the generated random number seed and the random number generator of the server, and
in a case where a process using a random number is executed with the transition of the node, the terminal control unit executes the process using the random number seed received from the server and the random number generator of the terminal.

6. The control system according to claim 5,
wherein, in a case where the process using the random number is executed with the transition of the node, the terminal control unit designates a category, changes a value of the random number seed according to the designated category, and executes the process using the random number seed whose value has been changed and the random number generator of the terminal, and
in the verification process, in a case where the process using the random number is executed with the transition of the node, the server control unit designates the same category as the category designated by the terminal control unit in the corresponding process performed in the terminal, changes the value of the random number seed according to the designated category, and executes the process using the random number seed whose value has been changed and the random number generator of the server.

7. The control system according to claim 6,
wherein the terminal-side setting information includes the number of times the terminal control unit uses the random number for each category in the game, and the server-side setting information includes the number of times the server control unit uses the random number for each category in the verification process.

8. The control system according to claim 1,
wherein, in the verification process, in a case where it is determined that the values are not the same as a result of comparing the values with the transition of the node, the server control unit establishes a state in which the game is resumed from a stage before a stage in which the value of the terminal-side setting information determined to be the same as the value of the server-side setting information was recorded in the log data in a past or establishes a state in which the game is resumed from a beginning.

9. The control system according to claim 1,
wherein the log transmission condition is a condition that a periodic timing has come or a condition that a predetermined number of logs have been recorded in the log data.

10. A server that is capable of communicating with a terminal and provides a game in cooperation with the terminal, the server comprising:
a server control unit,
wherein, before the game is provided, a state is established in which each of the server and the terminal is capable of using common node definition data corresponding to the game,
a plurality of nodes indicating a state of the game are defined in the node definition data, and
the server control unit has a function of executing a verification process that receives, from the terminal, transmission log data including a log indicating transition reproduction information capable of reproducing a transition of the node performed in the terminal and a log indicating a value of terminal-side setting information which corresponds to the node definition data of the terminal and has been changed with the transition of the node, reproduces the transition of the node on the basis of the transition reproduction information of the received transmission log data and the node definition data of the server, changes a value of server-side setting information corresponding to the node definition data of the server with the transition of the node, and compares the value of the server-side setting information with the value of the corresponding terminal-side setting information recorded in the transmission log data.

11. A control method executed by a control system that includes a server and a terminal capable of communicating with the server and provides a game,
wherein, before the game is provided, a state is established in which each of the server and the terminal is capable of using common node definition data corresponding to the game,
a plurality of nodes indicating a state of the game are defined in the node definition data, and
the control method comprising:
a step of allowing the terminal to transition the node on the basis of the node definition data of the terminal, to change a value of terminal-side setting information corresponding to the node definition data of the terminal with the transition of the node, and to record transition reproduction information capable of reproducing the transition of the node and the value of the terminal-side setting information changed with the transition of the node as a log in log data while the game is being played by a user;
a step of allowing the terminal to transmit transmission log data including the log recorded in the log data to the server in a case where a log transmission condition related to the transmission of the log is established; and
a step of allowing the server to execute a verification process that reproduces the transition of the node on the basis of the transition reproduction information of the transmission log data received from the terminal and the node definition data of the server, changes a value of server-side setting information corresponding to the node definition data of the server with the transition of the node, and compares the value of the server-side setting information with the value of the corresponding terminal-side setting information recorded in the transmission log data.

* * * * *